US012792350B2

(12) United States Patent
Madurawe

(10) Patent No.: US 12,792,350 B2
(45) Date of Patent: Nov. 10, 2026

(54) INTERCONNECT STRUCTURES FOR CONFIGURABLE CPU PIPELINES

(71) Applicant: Raminda U. Madurawe, Sunnyvale, CA (US)

(72) Inventor: Raminda U. Madurawe, Sunnyvale, CA (US)

( * ) Notice: Subject to any disclaimer, the term of this patent is extended or adjusted under 35 U.S.C. 154(b) by 189 days.

(21) Appl. No.: 18/656,836

(22) Filed: May 7, 2024

(65) Prior Publication Data

US 2025/0348312 A1 Nov. 13, 2025

(51) Int. Cl.
*G06F 9/30* (2018.01)
*G06F 13/40* (2006.01)

(52) U.S. Cl.
CPC ........ *G06F 9/30145* (2013.01); *G06F 9/3004* (2013.01); *G06F 13/4022* (2013.01); *G06F 13/4068* (2013.01)

(58) Field of Classification Search
None
See application file for complete search history.

(56) References Cited

U.S. PATENT DOCUMENTS 6,211,697 B1 * 4/2001 Lien ................. H03K 19/17732 326/39
6,242,945 B1 * 6/2001 New .................... H03K 19/177 326/38

(Continued)

FOREIGN PATENT DOCUMENTS

EP 3627331 A1 * 3/2020 ........... G06F 13/362
EP 3346426 B1 * 12/2023 ........... G06N 3/0495

OTHER PUBLICATIONS

Antonio González, Fernando Latorre, and Grigorios Magklis, (2011), "Processor Microarchitecture: An Implementation Perspective", Morgan & Claypool: pp. 4-7.

(Continued)

*Primary Examiner* — Steven G Snyder

(57) ABSTRACT

A microprocessor to execute instructions and functions (defined as a macroprocessor) comprises a configurable CPU pipeline. Interconnect structures for configurable CPU pipelines are disclosed. In a first aspect, a configurable data router in an interconnect structure comprises a signal generation unit comprising configuration memory to dynamically receives a bit-code, decode and program configuration memory elements to generate a plurality of control signals to alter data bus coupling for pipelining. In a second aspect, a bit-byte configurable interconnect fabric blends bus-architectures of CPUs with bit-architectures of FPGAs for efficient heterogeneous computing. A bit-byte configurable interconnect fabric facilitates bus data flow between logic-blocks as well as bit-computing within logic-blocks, dramatically reducing the configuration memory required. In a third aspect, a configurable interconnect structure provides bit-stream configurability (at boot time) for user define content to execute in hardware as complex functions, and bit-code configurability (dynamically at run-time) to allow flexible sequencing of a plurality of complex functions to construct concatenated macro functions. In summary, the configurable interconnect structures provide the capability to dynamically program configurable CPU pipelines for a user defined application software content to execute in a custom hardware image.

20 Claims, 10 Drawing Sheets

400

(56) References Cited

U.S. PATENT DOCUMENTS

| | | | | |
|---|---|---|---|---|
| 6,622,195 | B2 * | 9/2003 | Osakada | G06F 13/4022 710/316 |
| 6,654,841 | B2 * | 11/2003 | Lin | H05K 5/0278 710/301 |
| 6,693,452 | B1 * | 2/2004 | Ansari | H03K 19/17732 326/38 |
| 6,798,239 | B2 * | 9/2004 | Douglass | G06F 15/7867 326/38 |
| 7,696,782 | B2 * | 4/2010 | Liu | H03K 19/177 326/38 |
| 7,809,866 | B2 * | 10/2010 | Liu | G06K 19/077 710/72 |
| 9,405,717 | B2 * | 8/2016 | Brontvein | G06F 13/4022 |
| 9,430,239 | B2 * | 8/2016 | Tu | G06F 9/38 |
| 10,073,800 | B2 * | 9/2018 | Uekuri | G06F 1/3206 |
| 2009/0206876 | A1 * | 8/2009 | Liu | H03K 19/177 326/39 |
| 2012/0303932 | A1 * | 11/2012 | Farabet | G06F 15/7867 712/30 |

OTHER PUBLICATIONS

Patel D., (Dec. 15, 2021), “Advanced Packaging Part 1—Pad Limited Designs, Breakdown of Economic Semiconductor Scaling, Heterogeneous Compute, and Chiplets” https://www.semianalysis.com/p/advanced-packaging-part-1-pad-limited.

* cited by examiner

400

| 3-Bit Code | Output 8-Bits |
|---|---|
| 000 | x0000000 |
| 001 | X0000001 |
| 010 | X0000010 |
| 011 | X0000100 |
| 100 | X0001000 |
| 101 | X0010000 |
| 110 | X0100000 |
| 111 | X1000000 |

INTERCONNECT STRUCTURES FOR CONFIGURABLE CPU PIPELINES

This application claims priority from Provisional Application Ser. No. 63/468,059 entitled "Macro-Processor Architectures", filed on 22 May 2023 and Provisional Application Ser. No. 63/468,061 entitled "Content-Compute Processors and Architectures", filed on 22 May 2023, all of which have as inventor Mr. Raminda U. Madurawe and the contents of which are incorporated-by-reference.

This application is related to application Ser. No. 18/656,851 entitled "Content Compute Processors and Architectures" and application Ser. No. 18/656,824 entitled "Macroprocessor Architectures for Pipelined Flexible-Function Computing", both filed concurrently and list as inventor Mr. Raminda U. Madurawe, the contents of which are incorporated-by-reference.

BACKGROUND

1. Field of the Invention

The present invention relates to configurable integrated circuits, and further relates to computer processor units (CPU), field programable gate arrays (FPGA) and application specific integrated circuits (ASIC). CPUs include microprocessors, microcontrollers and other forms of instruction-based processing units. FPGAs include other types of programmable logic devices (PLDs). ASIC includes Gate-Arrays and other forms of transistor-based accelerator circuits (such as neuron processors, language processors, in-memory compute units, and others). Integrated circuits comprise hardware architectures (HWA) that allow user-defined software code to execute in electronic circuits fabricated in semiconductor devices. Instruction set architectures (ISA) offer a set of instructions that can be compiled to an ISA compatible pre-defined HWA. Specifically, the invention relates to configuration circuits and configurable structures in a user configurable function processor. More generally, the invention relates to configurable structures, bit-level and byte-level configurable segmented interconnects, configurable elements and configuration circuits used in user configurable integrated circuits. In addition, the invention relates to CPU-Pipelines and FPGA structures wherein user configurable execution units can be dynamically altered to execute flexible functions. A Microprocessor comprising a Configurable CPU-pipeline is hereafter defined as a Macroprocessor. A Macroprocessor computes a user defined content of an application software program by programming a configurable execution unit to the content-functionality.

2. Prior Art

A Microprocessor, also known as a Central Processing Unit (CPU), is a widely used first embodiment of a programmable device in the Integrated Circuits industry. The programming is done by executing ISA-instructions. It comprises a plurality of hardware structures (arranged in the HWA) to process the pre-defined instruction-set (defined in the ISA). The matched HWA-ISA duality allows a control-unit to select a plurality of dedicated hardware structures to execute all instructions using control-signals. Each activity takes one or more clock cycles. Compiled instructions reside in memory, in the form of data-strings, and when the instruction is loaded (or read) into an instruction-register (IR), an IR decoding circuit instructs the control unit to provide hardware functions needed to execute the instruction. Hardware functions are circuit blocks, hard wired during manufacturing to perform specific functions, have one or more inputs, and generate one or more outputs in response to the inputs. In a variant of the Microprocessor HWA, called Single Instruction Multiple Data (SIMD), one instruction may select a plurality of identical hardware functions to process different input compute data simultaneously. User gets to parallel process compute data to improve performance. In both cases, the instructions & hardware blocks are pre-designed to match for control-signals to select the cyclically desired hardware block.

A Microprocessor uses a plurality of stages in a CPU-pipeline to execute an instruction. In an exemplary 7-stage CPU-pipelined processor (Ref-1 Gonzales et. al.), the seven stages are: Fetch, Decode, Rename, Issue, Execute, Write Back and Commit. There may be more than 20 or 30 stages in a CPU pipeline. Instruction data moves via a cache memory hierarchy into an instruction cache (I$), and the instruction specified compute data gets moved thru the same coherent cache memory hierarchy to a data cache (D$). An N-wide super-scalar has N parallel execution branches in the CPU-pipeline, each branch having multiple stages and at least one execution-unit. In some architectures, each branch can have a plurality of parallel execution units. One or more instructions (for 4-wide, 4 instructions) get issued to an instruction queue from I$. When instructions are issued into a branch in the CPU-pipeline, a load-store unit fetch the related data via a load-queue into a General-Purpose-Register (GPR) bank for data-execute operation. Only an instruction in the queue with related data in GPR gets issued into an Execute-Stage of the CPU-pipeline. The instruction resides in the queue until the related data is available. More often there are two threads in a CPU, both threads sharing a common GPR bank. For reduced instruction set computer (RISC) architecture, the GPR contains 32 Registers. A super-scalar, 4-wide, with 2-threads, having 30-stages per pipeline, carry 4*2*30=240 instructions every cycle through the CPU-pipeline. Instructions Per Cycle (IPC) determine the efficiency of the CPU. For an exemplary 8-wide super-scalar, the theoretical maximum IPC-8, which is never realized. An IPC=3 is considered best-in-class for super-scalars due to dependent data, cache misses and common GPR sharing. We can expect at most 3-execute instructions per cycle per CPU (in both threads), although 240 instructions move through the 8-branches. This leads to significant wastage of power in CPUs.

The Instruction-Register (IR) of a Microprocessor comprises two segments: a first segment for Opcode and a second segment for Address, named as IR-Opcode and IR-Address, based on a partitioning of higher order bits and lower order bits. The first contains microprocessor operational instructions, and the second contains memory subsystem address instructions wherefrom data and instructions are retrieved and/or stored. Instruction decodes treat IR-Opcode and IR-Address segments separately, and an instruction-type determines how the instruction bit-field is divided between the two. Some instructions concatenate a plurality of instructions that require more complex decoding schemes. A TAG is used to synchronize the data-segments that must be used with the instruction to ensure compute accuracy. IR-segment is very large since it needs to access very large computer storage space known as SSD-Memory (solid state drive memory) addresses. 2.8 Tera Byte memory needs 48-bit IR-address, while 128 Mega Byte memory needs 27-bit IR-Address. The IR-Opcode scale with microprocessor ISA. A 6-bit Opcode supports 64, an 8-bit Opcode supports 256, while a 16-bit Opcode can support 65,536 instructions, with successively increasing decode complexity. Instructions consume a large portion of available data bandwidth.

Not all instructions are related to data-compute (such as arithmetic-logic, floating-point logic, multiply-accumulate etc.). Some are related to data-movement (such as load, store, move etc.) and some are related to tracking and book-keeping (such as stack pointer, program counter, jump etc.). All instructions activate control signals that select HW mechanisms to facilitate data propagation from one REGISTER-file to another REGISTER-file. It is common to see Load-Store ISA for various low Instruction Register (IR) Opcode compute HWA such as in popular ARM and RISC processors. In a RISC the smaller IR-Opcode allows use of simple instructions that can be executed within one clock cycle. A complex command must be divided into separate simple-commands that include "Load" to fetch data to GPR, "Execute" to perform some data-compute operation, and "Store" the result back from GPR: hence the Load-Store notation. Smaller length of IR-Opcode, requires less RAM in storage and Instruction Registers, making these systems more efficient. RISC makes hardware simpler to build, use fewer instructions, but increase compiled code density to construct more complex instructions by concatenating simpler instructions. A Complex Instruction Set Computer (CISC) uses a higher IR-Opcode that offers a much larger ISA. A large ISA reduces compiled-code density as a complex task takes up fewer lines of assembly code. Processor hardware must be built to understand and executing the "one or more operations" that make up the complex instruction. These have much harder HW to build, but offer less instructions to specify, and less code to store. As an example, a multiply operation in CISC may require one instruction, where as it may take 4 instructions in RISC to do the same task. Low code size in CISC does not necessarily reduce Cycles Per Instruction (CPI) as more cycles may be needed to complete the instruction. Microprocessors struggle with this trade-off: simplify coding with CISC-use complex HWA—have less compiled code to store, or simplify HWA with RISC—have more compile code to store. Best of both worlds where both CISC & RISC can be used is not feasible in HWA that involves pre-configured control unit bus-width and wiring.

The single most advantage of Microprocessor is in the ability for a user to write very high-level software programs in languages such as Python, Java, C++, etc. and have that code compile into the ISA and HWA via software preprocessors, compilers, assemblers, linkers and loaders. This has led to the electronic universe as we know today, with a proliferation of software applications that are able to use Microprocessor based computers.

A first disadvantage is that a Microprocessor must receive Instruction-Data as well as Compute-Data, and the Integrated Circuit chip in which the Microprocessor reside must use its Input-Output (IO) interfaces to receive and transmit data. It is widely documented in the literature that IC-Chips are IO-bandwidth limited in its compute capability, depicted by Moore's law in how transistor counts scale over time. IO-Bandwidth is scaling ~½ the rate of transistor scaling (Ref-2 Patel D.), exacerbating the problem over time. It can be shown that the largest growing gap is the real-data compute demand, which is significantly exceeding the data bandwidth available. Using 20% to 80% of the total available IO-bandwidth for Instructions is a significant penalty in Useful-Data computing. We saw CISC instructions require many more instruction-bits compared to RISC instructions. We saw RISC require many more instructions compared to CISC. Both exacerbate IO bandwidth gap in different ways. This is a major drawback to Big-Data and High-Performance-Computing application needs. We would prefer higher IO-Bandwidths dedicated to Compute-Data.

A second disadvantage to Microprocessor computing is the amount of wasted power needed to move instructions on a cycle-by-cycle basis, every cycle. In the previous example, we noted that 240-instructions moved in 1-cycle to get a maximum of 6-execute operations. All of these operations consume power: instruction move from Memory to IR (memory read power), then IR to decoder 105 (driver power), decoder consumes logic power, decoder to all HW function groups & multiplexers (driver power). In addition, instruction movement in the caching-hierarchy also consumes power. There are many more power consuming cycles involved including but not limited to: pre-fetch, decode, rename, issue cycles, etc. A rule of thumb estimate in Microprocessor super-scalars is that only ~10% of the CPU-core power is used up by the execute-unit; remaining 90% is used up by the instruction movement and logistics associated with the out-of-order (OOO) instruction processing. These instructions, stored as micro-code, keeps changing every cycle. For a 4 GHz clock frequency, a 4-wide, 2-thread, 30-stages/pipeline will see 960B power consuming operations/see to realize 24B theoretical maximum useful compute-executes. We would prefer most of the power consumption dedicated to useful data compute activity, not to move instructions around.

A third disadvantage to Microprocessor computing is its inability to process sequential compute operations. A SIMD device that can provide data-parallel computing of HW function can do so by sharing a common-instruction across all parallel compute stages of a thread. Crossing threads by common workload instructions is not allowed in CPUs due to the difficulty of preventing data-conflicts and interrupts. Highly parallel SIMD has excellent value in certain operations such as matrix-multiplication. Most compute operations in the real world do not lend to only data parallelism. More often, the output of a compute function becomes an input to the next compute function. This sequential feature is seen in cryptography, security, multi-media, enterprise search engines & AI. Specifically in Big-Data applications, compute data is encoded and compressed. Data is transmitted in variable length packets. Results of a header information is needed to decipher data length and decoding scheme: both sequential operations. In video JPEG compression, pages of finite-sizes are compressed. Those benefit by pipelining and instance-parallelism. In AI inferencing, the transformer generation phase is highly sequential as the predicted token depending on the previous token predicted. Microprocessors would benefit by serial processing of each instruction, serially feeding the result back into a loop operation, to reduce data-movement power and delay in CPU-pipelines. SIMD data parallelism hurt sequential operations due to underutilization of resources. In a pipeline, it is not possible to skip stages without inserting a bubble (a wasted cycle) if the HWA is not pre-wired for data by-pass between the stages. Industry techniques used for Big-Data and HPC sequential compute performance improvements using pipelining and model-parallelism (in custom ASIC & FPGA products), are not available for Microprocessors. It is desirable to have pipelining and model parallelism, preferably interpreted from user-software code without user intervention, to improve compute performance.

Microprocessor ISA and HWA do not lend to compute data pipelining of random order in HW Functions based on user application need. In the HWA, some selected common HW choices may have pre-designed hard-wired pipelining: useful only if the user can make use of that specific sequence identically. It is common in Microprocessor HWA to specify a 5-stage to 30-stage (or more) pipelined architectures. In such systems there is an instruction execution efficiency improvement when out of order instructions are queued for execution in an issue-queue. In a super-scalar, the parallel branches feed these issue-queues to improve execution-unit utilization. For general purpose computing, this parallelism may reach 4-wide or 8-wide branches. For 2-input execution units, 16-wide is a theoretical maximum to share a common 32-GPR register bank. The net benefit in cost by increasing HW-width parallelism has diminishing return, as they all share the "limited" GPR-bank (32 for RISC) and "dependency" in data. A metric commonly used in microprocessor performance is Instructions-Per-Cycle (or IPC, which is the inverse of CPI), and the best in class is ~3 IPC even for a 16-wide architecture, since the physical GPR-addresses get dedicated to Execution-Units in HWA. A fourth disadvantage in microprocessors is the low IPC number in spite of increasing available HW resources significantly. As an example, if there are 8 Arithmetic-Logic Units (ALU) and 8 Floating-Point Units (FPU) in a 16-wide super scalar Microprocessor Core, it is desirable to get at least IPC=16 since all 16 HW Function units are available to compute data in one cycle. The low IPC values from Spec2K performance benchmarks indicate that user programs do not lend to ease of parallel HW utilization in general purpose computing. It is desirable to improve the Microprocessor IPC metric for generic computing.

Microprocessor ISA does not lend to convenient and efficient use of implementing Application-Specific Software. Application SW developers use algorithms and diagrams to conceptualize their requirements, use high-level language code to write the SW program, then compile the SW-program to low-level assembly code to execute the application context. An Application Specific Integrated Circuit (ASIC) can capture the exact requirements (the context) accurately & efficiently, that efficiency gets sacrificed in a general process Microprocessor when the SW program is compiled to ISA compatible instructions. Each application has a unique "small set" of features that are used extensively or that need very high computing that are best served by ASIC accelerators; but this "small-set" varies between applications making it into a very large superset of HW custom-ASIC accelerators difficult to provide for all users in a general-purpose HWA. It is easy to visualize an extremely small set of instructions, where each instruction can be parallelized for SIMD HW operation for a very narrow range of applications. A Graphic Processor Unit (GPU) is an example of that. Using similar concepts, there are many other attempts to build HW accelerator chips with embedded ASIC-cores: neural processor units, language processor units, in-memory compute units, etc. In a GPU that comprise thousands of massively parallel SIMD ALUs or FPUs, the user gets efficiency, but they have very poor utilization & performance efficiency in general purpose applications when other HW units are needed. A GPU must have a CPU to handle the diverse needs of the user. In addition to graphics processing, this "narrow-target" feature has made math computations required in Artificial-Intelligence (AI) & Machine-Learning (ML) available to users, feeding into new applications such as Generative Pre-trained Transformers (GPT). The contrasting features in GPU, RISC & CISC CPUs are all needed by the users. We want SIMD RISC for most common frequently used general-purpose instructions. We want SIMD CISC for complex custom features even if not available in HWA. We want SIMD GPU for massively parallel computations. It would be even better if we can get Multiple-Instruction-Multiple-Data (MIMD) computing if we can get it. We want the choice of HW-function used in parallel or most frequently to be user-definable for that application developer, not the IC-chip manufacturer who builds the HWA. This is another disadvantage with Microprocessor architectures—not getting exactly what you want in HW. It is desirable to have a Flexible-ISA with matching Flexible-HW for varied Application-Specific use modes in General-Purpose computing. It is desirable to empower Application SW Developers with software configurable ASICs, without having to re-invent the user interface, APIs and Compilers to execute SW in HW.

A Field Programmable Gate Array (FPGA) is a widely used second embodiment of a general-purpose programmable device in the Integrated Circuits industry. A tile in an FPGA is constructed as an array of programmable blocks, programmable interconnects, memory, digital signal processing (DSP) HW blocks, and switch-blocks. In an FPGA, there are a plurality of such tiles replicated with IO and other circuitry required to build the FPGA chip. A user programmable logic blocks comprises one or more programmable logic elements and programmable logic element connection switches. A programmable logic element further comprises one or more programmable look up table functions (known as LUTs) and one or more distributed registers embedded within the logic element. A LUT-function can implement any user logic function of N-inputs. As an example, a 4-input LUT function has 16 Memory-Cells to store the LUT values. Any combination of 4 inputs (0, 1 combinations) will select one of those 16 LUT-values. An 8-input LUT function would require 256 LUT-values to implement all possible functions. A LUT-tree is when an 8-input function is broken into 4-input LUT-functions, and concatenated to complete the 8-input function. In a LUT-tree, 16 4LUTs with 4 common inputs would feed into a 4LUT that receive the remaining 4-inputs, to build the 8-input LUT tree. A truth-table can be constructed to represent the desired function, and the 16 memory bits in 4LUT programmed to implement the desired function. A software tool does this translation easily. A LUT is a bit-wise operation. Operands or data is received as inputs to LUTs. LUT function is programmed as LUT-values. Outputs of LUT functions can be registered, or connected as inputs to an adjacent LUT function in same logic block, or in a different logic block, using the programmable routing connections. Complex combinational or sequential logic trees can be constructed to implement very large designs. As an example, an entire RISC microprocessor core can be implemented in an FPGA fabric. Switch-blocks assist in the connectivity of horizontal and vertical wires in an FPGA interconnect structure. The interconnects are programmed by a software tool that extracts logic connectivity from a synthesized netlist of a design. Memory and DSP HW blocks provide data storage and accelerated math-functions in an FPGA. These are important features to get higher performance. The LUT functions offer special carry-in and carry-out signals to facilitate carry-logic implementations using LUTs. LUTs also offer logic needed to convert integer numbers to floating-point numbers for arithmetic operations. Configurability allows the user to program the FPGA to execute very complex user specific applications. Configurability makes FPGAs a general-purpose IC device that is customizable to a user specification.

Inputs to LUT-functions, LUT-function grouping, register density, logic element-block-tile hierarchy, interconnect hierarchy, interconnect and switch density, all play into incrementally building larger and more complex combinational and sequential logic functions to realize good compute performance and utilization efficiency at lower power consumption. To place a user application into a pre-fabricated FPGA, the user has to write the application in Verilog or RTL code, use a synthesis tool to convert RTL into a netlist of gates and nets. The synthesized netlist must be mapped into the FPGA HWA to pack LUTs, group LUTs in blocks, clusters, and tiles hierarchically, and route the nets to get the connectivity needed. A SW tool, called a Software Development Kit (SDK), automatically adjust LUT placement to get best timing for critical paths to operate at maximum frequency. It is common to see 16-levels of logic in a critical path that force maximum operational clock frequency to be about 200-500 MHz. The SW tool performs a timing & utilization analysis and ensure uniform logic placement with no setup or hold violations in the ensuing netlist connections. When a best-in-class Microprocessor can run at a clock frequency of ~4 GHZ, the best-in-class FPGA can only run at ~400 MHz (10× slower). Once the application placement is finalized to user satisfaction, the pack-place & route (PPR) software tool sends out a BitStream that define the status of every single configurable bit (called configuration memory, or CRAM bits) in the FPGA. Modern FPGAs use a custom SRAM cell to construct CRAM. A boot-ROM can hold this BitStream (aka bit pattern), and at boot time, after the FPGA is powered up, the chip is configured using special circuits that perform this configuration of CRAM bits. It can take millions of cycles to completely configure the entire FPGA due to the sheer magnitude of total configuration CRAM bits resident in an FPGA. Since it is done only once during power up, the boot-time penalty is only incremental, with minimum impact to users. The term BitStream is used herein to identify the bit level connectivity of FPGAs for a user defined function. After configuration, the FPGA acts as an ASIC until the BitStream is changed to define a new function (or a new ASIC).

A single biggest advantage of FPGAs is that it can use pipelining and model-parallelism to improve compute-performance. Pipelining allows staging of sequential operations so that different tiles can work on segmented computes to increase the net compute efficiency. A 4-stage pipelining will not alter the latency of each Data-Compute delay from start to finish; but it will allow 4× faster data throughput since the 4 segments can simultaneously work on 4 consecutive data packets. Model parallelism allows instantiating multiple copies to parallelize data compute. This is similar to the SIMD concept in microprocessors, except the user chooses level of data parallelism. Even discounting for the 10× slower performance, very high parallelization can offer a significant improvement in net compute performance, and FPGAs are often used as general-purpose data-accelerators. Due to 10× slower performance, high LUT logic & interconnect area requirement due to bit-programmable FPGA fabrics, and the complexity involved in re-writing SW-code in Verilog or RTL, FPGAs are not easy to use as custom accelerators in domain specific applications.

A first and major disadvantage with an FPGA is that it is not a high-level SW code usable HW execution platform. SW code does not have Register-Transfer information, which is required by FPGA tools for HW implementation. Microprocessors operated on cyclical HWA that allows SW code to be easily translated to HW. All the vast collection of sophisticated SW applications that make up our universe, find no applicability to FPGA devices. Only a very small user-group can code in Verilog or RTL, and they lack the vast skill sets needed to convert the multitude of application-specific software platforms or APIs to RTL. Only a few applications are targeted to FPGA devices, and when that happens, the entire end-to-end application must reside inside the FPGA device to realize any benefit. It is desirable for FPGAs to contain a mechanism similar to "cyclical accuracy" in CPUs for software users code to execute in FPGAs more easily.

A second disadvantage with an FPGA that is related to the first disadvantage is that when synthesized RTL is placed and routed into critical-path logic trees, the overall compute performance & latency becomes a case-by-case output result of the gate-level netlist placement & optimization in the FPGA. Software tools cannot work with this uncertainty, as there is no mechanism to automatically pipeline sequential operations, or use model-parallelism to achieve a desired performance level. Data transfer from a host CPU into an FPGA accelerator is a performance bottleneck, since the CPU must rely on an IO-communication protocol to engage the FPGA. It is desirable to have SW tools determine how the FPGA logic placement and performance optimization, with a predictable latency that is tied to the CPU frequency, so that SW code can be pipelined in HW between the CPU and Accelerator. Such fabrics will facilitate heterogeneous computing across all HWA platforms (such as CPU & GPU) that depend on SW operability.

A third disadvantage with an FPGA is that the configuration area overhead to configure LUT logic and Routing is very high. It could be as high as 20%-33% of the Logic-Block area. This makes it slow & expensive to use FPGA's: slow since signals must traverse over the configuration area (larger capacitance & wire delay) and expensive due to silicon area penalty (compared to an ASIC). Reducing configuration bit CRAM density hurt logic placement & routing efficiency leading to poor utilization and poor performance. This has been proven in the FPGA industry by FPGA-venders who offer low cost, low performance products and high cost, high performance products by modifying CRAM bit density and interconnect/routing density. The total number of segmented wires needed in the configurable interconnect fabric is the biggest contributor to logic utilization inefficiency. It is desirable to have higher performance in an economical (lower configuration overhead area & cost) FPGA interconnect fabric.

A fourth disadvantage with an FPGA is that configuration time is very long for an application that may benefit from run-time dynamic configuration. There are two fundamental difficulties with dynamic reconfigurability of FPGAs. The first problem is the sheer number of configuration bits that must be loaded: these add up to millions to 100's of millions. It takes a long time to send this data from a Boot-ROM into distributed configuration CRAM bit locations. The second problem is a more disastrous driver-contention that can arise during bit-reconfiguration. Segmented wires when connected provide directionality for data movement, which is dictated by drivers. One end of the wire transmits the signal, and the other end receives the signal. Configuration bits at either end determine the driver side & receiver side: if incorrectly assigned, both ends of the wire segment can become drivers. This could happen during the CRAM bit configuration time as it occurs in segments. Contention cause wire segment to sink excessive power one driver attempts to drive wire segment to power rail, and the other attempts to drive it to ground rail. With millions of wire-segments, this power increase can be disastrous. In the best case, it could be a metal electromigration reliability problem as wire-segments are not designed to have static power dissipation for extended times. Under worst condition this could lead to damage (burnt metal) as high fan-out signals may have a plurality of conflicting drivers forcing power into one individual wire segments (or an individual via) that is the weak point in the net. It is desirable that we can dynamically and safely alter the functionality of the FPGA, so the user can make use of dynamically reconfigurable functions to maximize area utilization and compute efficiency.

Another disadvantage with an FPGA is that we must use an extra special circuit to reuse a specific logic function in time multiplexing when needed. To do so, the original design must be modified. An FPGA design is hard-wired in time domain like an ASIC. Input data arrive at input terminals, output data is generated at output terminals after a specified latency. If the same feature is needed twice by the same data, a first option is hard-code it twice in the data path. A second option is to custom build (insert) a controller loop into the code, and re-design the data path RTL for a repeat operation of the same function, inserting an intermediate data storage to facilitate reuse. Software algorithm developer simply specify a loop in SW code. There is no run-time decision to make that duplication in RTL. RTL goes thru logic synthesis and PPR-software to map a design into HW, whereas CPUs used a compiler to map user-code into HW. An example is when a user needs to add 16-bit numbers N-times, where N could be a variable: 8, 16, 32, 64. In a CPU we could use one 16-bit adder, and loop the adder in time domain 8 to 64 times by passing N thru the stack as a variable. In FPGA we could dedicate a maximum N=64 16-bit add loop as hard-wired logic, use padded dummy '0' adds when N<64 into FPGA logic function. Adding extra control for loop back is at unnecessary area/cost penalty. What is desirable is to reuse FPGA logic functions "easily" when needed to improve area utilization and cost without having to re-engineer or modify the RTL-design. What is even more desirable is to mix and match FPGA functions to build more complex Macro-Functions along the lines of Microprocessor HW-reuse of simple instructions to build complex instructions.

We would benefit by a novel hardware architecture (HWA) that can overcome the von-Neuman or Harvard single-instruction processing limitations of CPUs and the high-level software barrier to entry in custom-RTL coded FPGA limitations, while maintaining the advantages they both provide in efficient use of hardware. We need an HWA that looks like a software-ASIC.

SUMMARY

A macroprocessor is an integrated circuit that has features, and capabilities that exceed microprocessors, wherein features and capabilities of ASICs, microprocessors and FPGAs are available in configurable CPU pipelines. A macroprocessor is a Multiple Instruction, Multiple Data (MIMD) compute unit that can significantly increase the number of computes per unit area and reduce net compute power. Said features include: hardware architecture, firmware, instructions, hardware resources & configurations. Said capabilities include: performance, power, price, quality and reliability, CPI & other metrics used in IC comparisons. A macroprocessor adheres to ease of high-level software execution in heterogeneous hardware units.

This macroprocessor invention is to build various embodiments of a computer processing unit that has the capabilities and features of: a microprocessor, a graphics processor, a field programmable gate array, and an application specific integrated circuit. A macroprocessor includes a microprocessor: which has an ISA & HWA similar to a custom processor, ARM processor, x86 processor, MIPS processor, RISC processor. The microprocessor may comprise one or more of: memory units, registers, arithmetic logic units (ALU), floating point units (FPU), address generation units (AGU), branch units (BRU), shifters, comparators, multipliers, integer processing units, digital signal processors (DSP), Analog Circuits, clocks, phase-lock-loops (PLL) and other circuits found in CPU circuits. A macroprocessor includes a field programmable gate array (FPGA). The FPGA may comprise one or more of: memory units, registers, ALUs, FPUs, carry-logic units, shifters, configurable logic elements, configuration memory (CRAM), look-up table logic blocks (LUT), comparators, multipliers, DSPs, Analog Circuits, clocks, PLLs, control status registers (CSR), configurable segmented interconnects and other circuits found in FPGA devices. A macroprocessor includes an application specific integrated circuit (ASIC). The ASIC may comprise specific custom functions that are specifically designed to do complex functions, including hard-IP, soft-IP & Programmable-IP that can be integrated into chip design, including accelerator circuits that enhance compute performance. Memory includes any form of volatile or non-volatile memory elements, including: SRAM, flash, EEPROM, MRAM, eFuse, laser-fuse, OTP, RRAM, DRAM and state-transition memory. Memory includes cache.

A macroprocessor is a function expandable processor unit that includes one or more CPUs tightly integrated (pipeline coupled) with one or more in-flight field programmable (FPGA) slices. The in-flight dynamically configurable field programmable gate array slice is defined hereafter as a Flexible Accelerator Unit (FAU). An FAU is user configurable, comprising CRAM memory, and can be viewed as a Software-ASIC by the SW-developers. A macroprocessor comprises an FAU in addition to traditional microprocessor execution units BRU, AGU, FPU, and ALU in a pipeline. Therefore, it can execute instruction commands in CPU microprocessor execution units, and functional commands in the FAU using its cache memory hierarchy. An FAU may include all or a portion of the components of an FPGA. An FAU may include other novel circuits that are not traditional in an FPGA, such as analog-circuits & clock divider circuits, branch units, and program counters, scratch-pad memory, L0-memory, memory-management units and CPU-interrupts. The CPU may-be RiscV, MIPS, ARM, x86, or any other custom processor, having a pre-defined Instruction Set Architecture (ISA). The FAU is either configured at Boot-time, or dynamically prior to an instruction execution to perform a complex function. An FAU may be reconfigured in one cycle. An FAU may be reconfigured in a plurality of cycles, extending to 1000's of cycles depending on a configurable bit content reconfigured. One or more FAUs may be combined to build large macro-functions. FAU may implement one function at all times. An FAU may implement an instruction defined function during execution time. The FAU function implementation capability makes the macroprocessor function expandable. The advantage of hybrid CPU-instructions and FAU-functions within the pipelined coupled interconnect fabric include: (i) off-loading and accelerating heavily used and/or high-compute content functions as FAU fixed functions under CPU supervision; (ii) Synthesizing and implementing complex instructions in dynamically configurable FAUs as functions to expand a pre-defined CPU ISA (as an example, a RISC ISA can be expanded with CISC instructions converted to FAU functions); (iii) Providing Multiple Instruction, Multiple Data (MIMD) execution unit that can significantly increase Instructions-Per-Cycle (IPC) metric; and (iv) Providing high IO bandwidth to compute data by removing Instruction-Data into FAU configuration bits. A macroprocessor may provide IPC of 100× or 1000× for compute intensive Big-Data and HPC applications. When the CPU is a RiscV microprocessor, the macroprocessor may process existing RISC ISA, pre-synthesized CISC instructions (converted to FAU function), and heavy-compute accelerator ASICs (placed in FAUs functions). A MIMD macroprocessor offers significant IO-bandwidth and compute throughput advantages, and exceed microprocessor data compute capabilities in Big-Data & HPC applications. A macroprocessor operates in a Load-Store computer architecture and adhere to well established ISA & SW Tools infrastructure. A macroprocessor provides content computing. Fabrication of a macroprocessor may include advanced semiconductor manufacturing processes, including 3D-packaging technology. A macroprocessor augments von-Neuman and Harvard architectural bottleneck of single-instruction execution by parallel processing capacity of FAU-accelerators in a pipeline. An FAU may comprise 1000's of instructions in a single execution command. An FAU may comprise 1000's of parallel compute units that gets executed in a single Accelerator Execution command.

This invention will be more fully understood in conjunction with the following detailed description taken together with the drawings.

DETAILED DESCRIPTION

In the following detailed description of the invention, reference is made to the accompanying drawings which form a part hereof, and in which is shown, by way of illustration, specific embodiments in which the invention may be practiced. These embodiments are described in sufficient detail to enable those skilled in the art to practice the invention. Other embodiments may be utilized and structural, logical, and electrical changes may be made without departing from the scope of the present invention.

The terms microprocessor and computer processing unit (CPU) used in the following description include any structure that can receive instructions and data, execute an operation, generate a result, and store that result. The structure comprises electronic circuits in an integrated circuit (IC) device. The structure is understood to include memory, control-units, decode circuitry, memory-tags, storage buffers, memory management units, cache structures, registers and other electronic circuits that are used to construct CPUs. The term pipeline is used to refer to the various structures in all of the stages required to process an instruction; from the time it is fetched from a memory location (such as instruction-cache) to the time it is retired after completing the instruction after writing results back into memory (data cache) if needed. It is understood that a plurality of instructions may be fetched in a super-scalar CPU, and a pipeline may have parallel branches to simultaneously execute multiple instructions. A pipeline may have in-order and out-of-order instruction execution capabilities, and for the later, additional structures required to ensure data integrity. The term thread is used to refer to a plurality of compiled instructions in a work-load that is generated from a user created software program during compile-time that comprise data dependency and an instruction-order that ensures execution accuracy.

The term configurable CPU pipeline is defined as a pipeline that includes a configuration circuit to configure a portion of the structures in the pipeline. The configuration circuit comprise configuration memory elements to program said portion of the structures, and the data to program the memory is not received in the bit-code of the instruction. Stored memory data determine the functionality of the structure, and the memory data is received as a bit-stream during a configuration time-interval.

Figure 1:
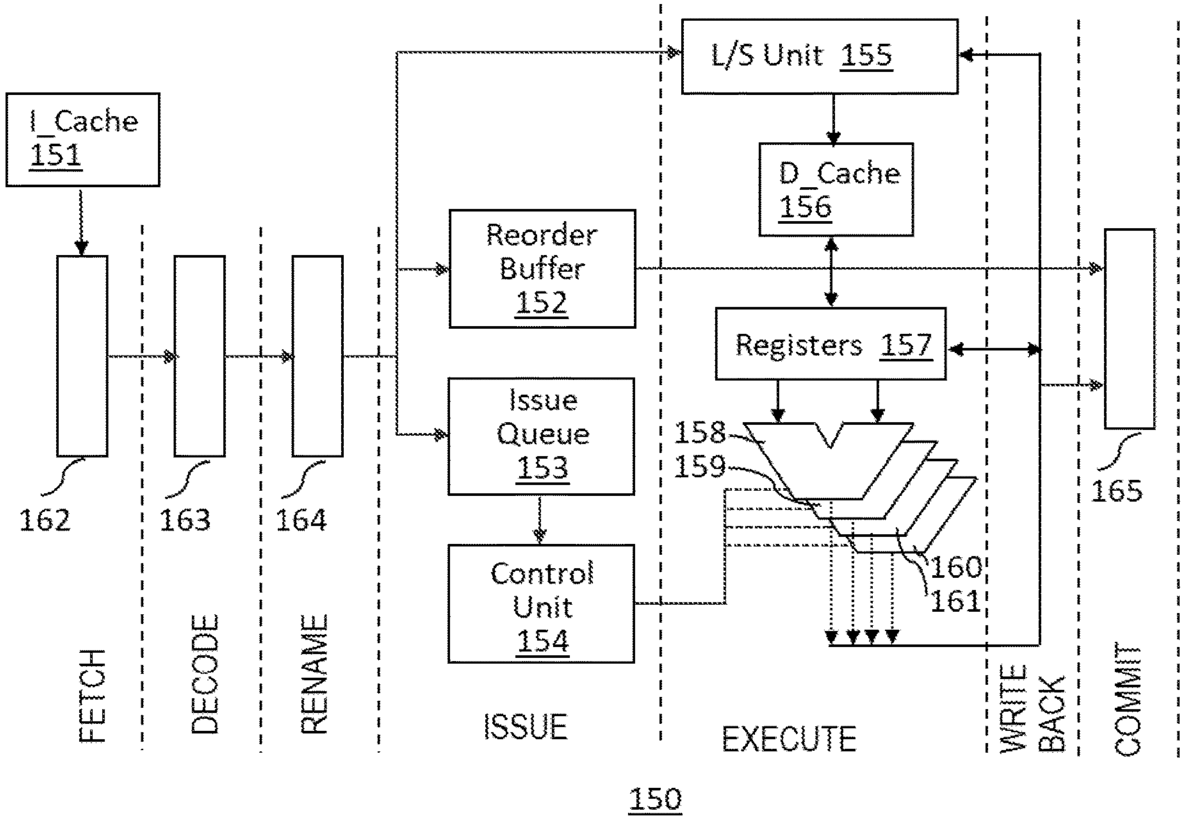
Fig. 1 (Prior Art)
FIG. 1 shows a prior art computer processor unit (CPU) pipeline that has 7-stages.

A cycle accurate 7-stage prior art Microprocessor CPU-pipeline 150 is shown in FIG. 1 (Ref-1 Gonzales et. al.). For a 4-wide super-scalar, there are four structures such as 150 in parallel, all four in combination called the CPU-pipeline. The seven exemplary stages are: Fetch, Decode, Rename, Issue, Execute, Write Back and Commit. Operating system (OS) of an SoC selects an available CPU to assign a compiled work-load thread. Memory management units (not shown) work with the designated CPU control unit 154 to get the instruction-data and compute-data from L3/L2 Caches (not shown) into L1 instruction cache (I$) 151 & L1 data cache (D$) 156 respectively. Data transfer is in page-sizes, such as in 4 Kb blocks at a time. This is automatic until the entire thread is loaded to L1-cache (L1$). Instruction & data are tagged to ensure execution accuracy, and cache memory coherency is ensured. One or more instructions are fetched into a fetch buffer 162. An N-wide super-scaler may fetch N-instructions per clock cycle. Instructions move through each stage, register to register every clock cycle, each stage performing an activity to decipher and execute the instruction. Decode reads the Opcode, and rename/reorder adjust instructions order for efficiency. CPU-pipeline 150 shows 4 pre-defined execution units in parallel: arithmetic & logic unit (ALU) 158, floating point unit (FPU) 159, address generation unit (AGU) 160 and branch unit (BRU) 161 to calculate program counter (PC). All execution-units match the ISA-instructions that engage them. Within an ALU, as an example, there are many function-variants: such as AND, OR, NOT, etc. Those too are also pre-defined to match the ISA. Opcode decoding allows the control-unit to select the desired pre-defined execute function. The selection, done with N-bit (N is an integer between 4 and 16) control signal, occurs at two levels: first the execution unit, and second the function within the execution unit. There may be other execution units such as integer multiplier units (IMU) or integer divider units (IDU). For in-order keeps the program order in instructions, and out-of-order (OOO) rearrange that order for efficiency during rename/reorder stage. The stages are sequentially pipelined, pipeline meaning that an instruction moves serially thru all the stages. Skipping stages is only possible if HWA has by-pass circuitry, if not, a bubble (aka a null operation) is inserted into the unwanted stage. Processors may have <7 to >30 stages. A thread of compiled instructions maintains the program order and data accuracy, and cache memory structures ensure that at each memory location. Parallel execution units in CPU-pipeline improve compute throughput at the cost of increased area, power and logistics complexity. CPU-pipelines must meet the proper order of instruction-data pairing in all executions. In-order systems are inefficient in the execution unit utilization, OOO-systems improve that efficiency at the expense of extra overhead to ensure proper order of executions with data dependency. Assigned thread is executed in a single CPU-pipeline 150, and the CPU-pipeline structures ensure instruction execution accuracy, even with OOO-systems. The name of each stage & structure shown in FIG. 1 identifies the operation involved in instruction processing. Decode 163 identifies the selection of a unique pre-defined execution unit from a plurality of ISA based execution units. 164 is rename stage, 165 is commit stage. Units 152-155 have a plurality of register files to facilitate smooth instruction movement into execution-units 158-161, and the proper instruction-data pairing at execution unit stage. L/S unit 155 has a load queue and a store queue; load commands bring data from D$156 to a load buffer in 155, and store commands save data in a store buffer in 155 back to D$156. Data flow between load buffer to GPR 157, and GPR 157 to store buffer happen in a FIFO nature; using +ve & −ve clock edges, of GPR registers transfer data from GPR to store-buffer, followed by bringing data from load-buffer to GPR cyclically. Each execution unit has an instruction issue queue 153. When valid inputs are available in GPR 157, control unit 154 selects the appropriate execution-unit & function to execute the instruction. A finished execution unit output is stored back into the GPR 157, and gets flushed out to the store queue when that GPR address gets the next load instruction. Write-back denotes the results getting updated in GPRs, and commit denotes reordering, book-keeping and retiring of completed instructions. Control unit 154 must steers HW function blocks to meet instruction need. An execution unit output may take one or more cycles. Some HW blocks, such as FPU 159, may take 4-20 cycles to generate its output (add=4, multiply=7, divide=20 cycles), whereas an ALU 158 may generate a valid output in 1 clock cycle. Data steering mechanisms (called drivers) know how to steer valid results at the proper time. The commit stage identifies completion of instruction after store queue of L/S unit 155 has updated the D-cache 156, and the instruction is no longer needed. If there is an error due to interrupts prior to instruction result is updated into D-cache, the entire pipeline must be flushed and restarted from the last known valid completed instruction. Computed data results are loaded back up the cache hierarchy by CPU control unit by engaging memory management units (not shown).

Figure 2:
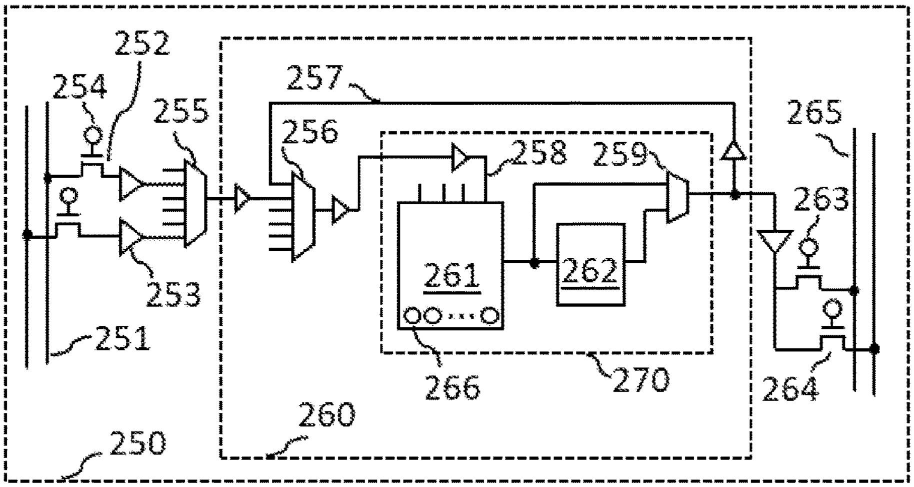
Fig. 2 (Prior Art)
FIG. 2 shows a prior art logic tile of an FPGA that has logic blocks, logic elements and programmable interconnects.

A detailed view of logic hierarchy and connectivity of a complex logic tile in prior art FPGA is shown in FIG. 2. Input data arrives in a plurality of wires (aka interconnects) 251. Selected inputs are coupled to tile 250 by a configurable switch matrix, each switch comprising a configuration bit 254 and a pass-gate 252. The configuration bit 254 is a memory element having output states of logic zero, or logic one. A plurality of selected (configured) inputs is available for logic in tile 250. A configurable multiplexer 255 selects one or more of those tile inputs to reach a logic block 260. There are a plurality of such logic blocks 260 in logic tile 250, each logic block selecting same or different inputs from tile inputs. 253 is a buffer, 257 is a unit 270 feed-back signal, and 258 is an input to LUT 261. Inside logic block 260, there is a plurality of logic elements 270, each logic element 270 choosing its inputs via configurable multiplexer 256. Configurable multiplexers also have a plurality of configuration bits such as 254. Logic element 270 comprises LUT-logic unit 261 and register (or flip-flop) 262. The LUT-logic unit contains configuration bits 266, named LUT-values, that when configured, define its logic functionality. In the illustration a 4-input LUT-function (notation 4LUT) is shown. 4LUT 261 has 16 configurable LUT-values 266. These 4 inputs and 16 LUT-values are needed to build the 4LUT function. Hard input values 0 & 1 are also available as inputs. The output of 4LUT 261 can be latched in register 262, or by-passed via configurable multiplexer 259 to another logic element. Output of 261 can be fed back to logic block 260, or to tile 250 for sequential logic, or taken out of the tile to a chosen wire from a plurality of available output wires 265 via configurable switch matrix having a plurality of configuration bits 263, and pass-gates 264. A plurality of sets of logic elements 266 combine to form a logic block 260 function. A plurality of logic block 260 functions combines to form a logic tile 250 function. Ensuing end complex logic function is named a LUT-tree. A segmented interconnect structure, connected thru a configurable switch matrix provide the mesh to connect logic blocks and logic tiles to one-another. The entire collection of configuration bits is connected to a configuration circuit to facilitate programming of memory bits. The configuration is usually arranged in a row-column grid system, similar to a memory array, so that all the configuration bits can be programmed by standard memory programming techniques; one row at a time. In an FPGA, there can be 100's of millions of configuration bits, and a bit-pattern that define the status of every single bit specifies a valid design implemented in the FPGA. For volatile SRAM based FPGAs, the configuration circuit must upload a valid bit-pattern from a storage boot-ROM in the system. This happens immediately after power-up of the FPGA, and take up 1000's of cycles to program the bit-pattern.

Figure 3:
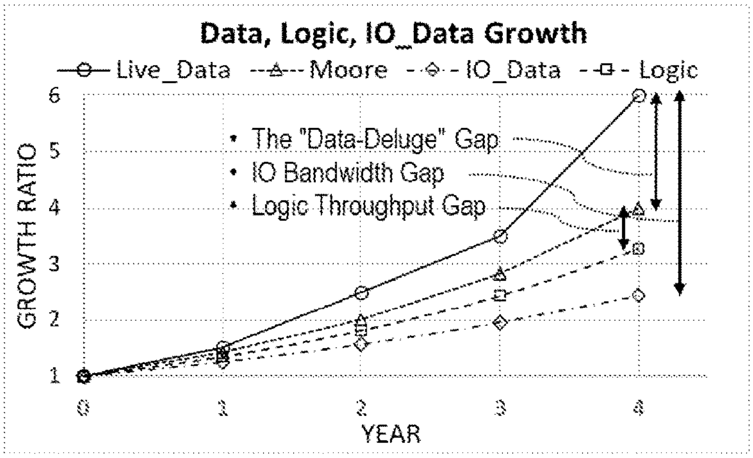
Fig. 3 (Related Art)
FIG. 3 shows a related art on industry growth rate for transistors by Moore's law, logic thruput, IO-Data bandwidth and real compute data demand over a 4-year time period.

For completeness, the IO-bandwidth limitation in IC manufacturing process capability is shown in related-art FIG. 3. Moore's law curve in FIG. 3 shows how transistor density nearly double every 2-years. Logic throughput gap shows that data compute capability is not keeping up with the transistor increase, and Data Deluge gap shows that real time date compute demand exceeds the transistor increase. The lowest growth rate in FIG. 3 belongs to IO-bandwidth, and the largest gap in FIG. 3 is the Real-Data compute demand vs. what IO-Bandwidth is allowing users to bring into the chip. 2D, 2.5D & 3D IO-interconnect and packaging technology attempts to improve the IO-Bandwidth limitation. In spite of all of these innovations, IO-Bandwidth is still a limitation on achieving very high compute capability in CPUs, GPUs, ASICs and FPGAs.

Figure 4A:
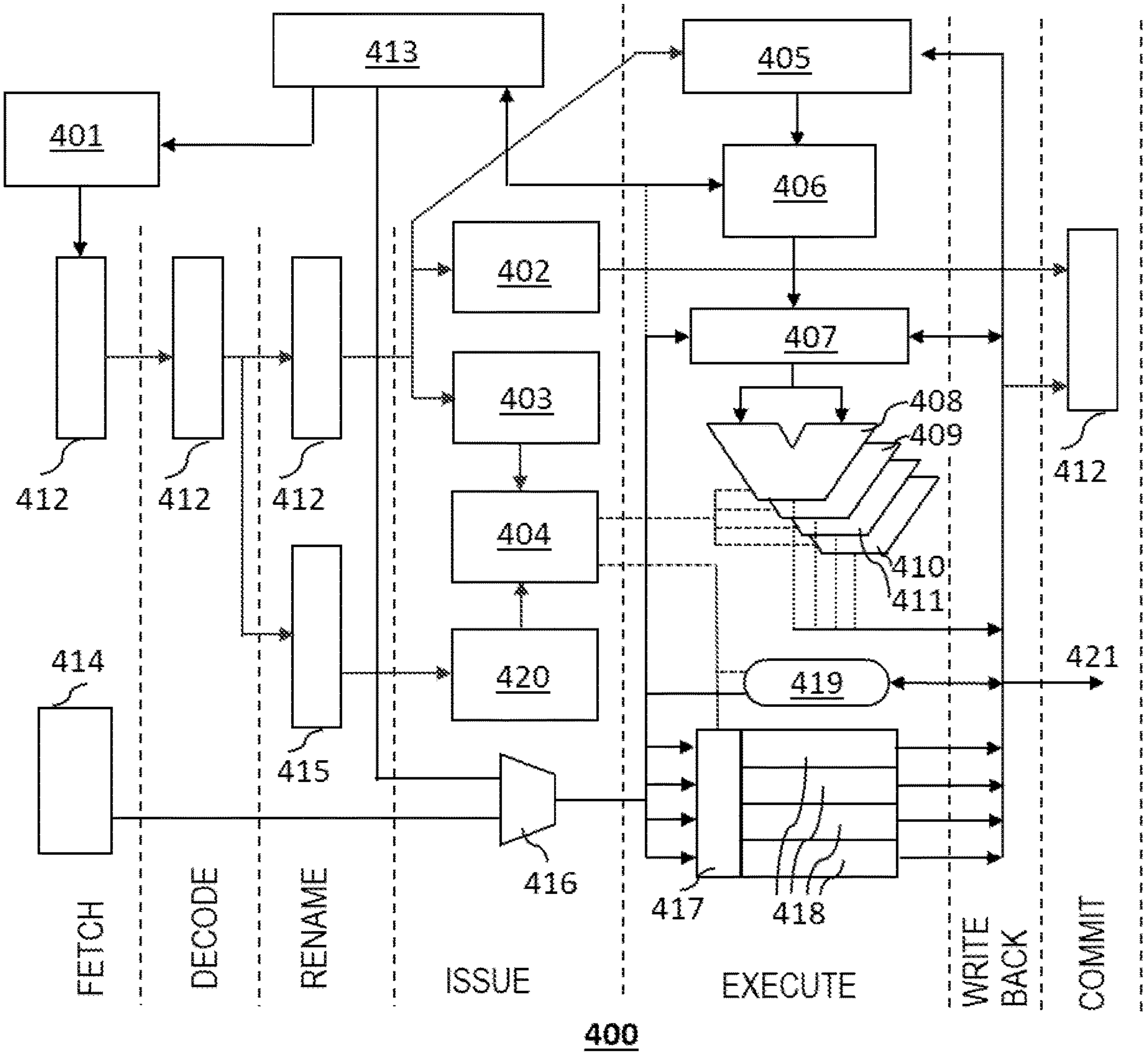
FIG. 4A shows a first embodiment of a macroprocessor pipeline with 7-stages.

A first embodiment of a macroprocessor 400 is shown in FIG. 4A. At a high level, the novel features in 400 can be identified by comparing FIG. 4A with prior-art FIG. 2. Macroprocessor 400 comprises L3-cache 414 & L2-cache 413. It includes a microprocessor, similar to FIG. 1, with related hardware components. For illustrative purposes a 7-stage (fetch, decode, rename, issue, execute, write back & commit) pipelined microprocessor (aka CPU) is shown. The CPU includes load-store (L/S) unit 405, I-cache 401, D-cache 406, data registers 407, control unit 404, ALU 408, FPU 409, AGU 410 & BRU 411 (as described in FIG. 2). CPU further includes a plurality of register files 412. Macroprocessor 400 includes: decode logic (not shown) to generate FAU instruction branch to a parallel rename register 415, An FAU specific instruction issue queue 420, a configurable multiplexer 416 to select data from one of L2-cache 413 and L3-cache 414, a plurality of FAUs 418 that are boot-time configurable and dynamically configurable, each FAU comprising LUT logic and segmented routing wire configurability. Each FAU further comprising DSP slices, carry-logic & registers. Each FAU further capable of having any other HW function units. FAUs 418 are coupled to a local data-cache 417, which comprises one or more storage elements, preferably single-port or multi-port SRAM memory. FAUs 418 may receive compute data from one of: L1-cache 406 via registers 407 that is shared with CPU, L2-cache 413 and L3-Cache 414. 402 is the re-order buffer. Macroprocessor 400 comprises a modified (over prior-art) control unit 404 coupled to CPU issue queue 403 and FAU issue queue 420. Executing CPU instruction in 403 activates control unit 404 signals to control data-flow and functions in CPU section, whereas executing one or more FAU instructions in issue queue 420 activates control unit 404 signals to control data-flow and functions in FAU 418 section. CPU & FAU instructions may execute concurrently. Plurality of FAUs 418 may be configured to execute multiple parallel executions of different instructions in one cycle (MIMD option). This is possible since the instruction-function resides in configuration bits, and different instructions can be programmed to reside within an FAU. CPU has to only ensure correct synchronized data flow to the inputs of each FAU. Macroprocessor includes a configurable data-flow mixer 419 (hereafter called the mixer) that can dynamically route CPU and FAU output data to any other input-port providing a one cycle feed-through mechanism for data-flow between functional units. This mixer 419 may be configured by CPU via control unit 404 using control signals. Mixer 419 may be a ring connector bus that traverse input and output ports. The exact functionality of the mixer will be discussed in detail at a later stage, but basically it allows to concatenate FAU functions and CPU functions to build much larger Macro-Functions that significantly boost performance efficiency. Mixer 419 allows pre-processing CPU functional unit 408-411 input data using FAU functionality. Mixer 419 allows post-processing CPU functional unit 408-411 output data using FAU functionality. A significant usefulness of this feature is for a first FAU 418 to decompress incoming compressed data, feed it to a second slice 418 to decode incoming encoded data, feed reconstructed data to ALU 408 or FPU 409 for data-compute. This auto-pipelining is dynamically adjusted by CPU instruction flow, synthesized by SW tools into the execution assembly code, independent of SW Application developer intervention. FAUs 418 may receive data from L1-cache 406 (or 407) and write results back to L1-cache or a scratchpad (not shown) without the need to retire data to L2-cache 413 for reuse, thereby improving data compute performance. FAU 418 and Mixer 419 may feed-through output data to adjacent compute cluster via output 421, allowing FAU & Functional-Unit sharing for data compute in multiple clusters. Depending on the position of cluster-to-cluster feed-through required, the latency may-be predetermined and managed by the control unit(s) 404. FAU memory 417 may contain a plurality of sets of configuration bit values. A first of said set of configuration-bit values may configure An FAU 418 to a first function. A second of said set of configuration-bit values may configure the FAU to a second function. A control signal from control unit 404 may select the first set or the second set of memory 417 data sets to configure the FAU, thereby providing a control option to dynamically change FAU functionality via control-unit 404. In one embodiment this may take 1-cycle. In another embodiment this may take a few cycles. In yet another embodiment this may take 1000's of cycles, managed by the CPU pre-emptively or during wait-for-interrupt idle time. The reconfigurable latency may depend on the extend and complexity of FAU functionality. Memory 417 may store 128 sets of configuration data sets that define 128 different functions, one stored function selected by a 10-bit memory 417 select address code generated by control unit 404 to configure FAU 418 as desired. Memory 417 may be used to configure FAU functionality, through a mechanism that is discussed later.

Figure 4B:
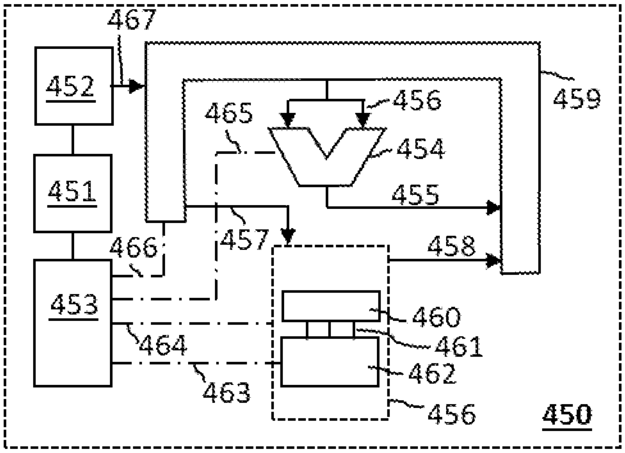
FIG. 4B shows the key features (instruction hardware unit and configurable hardware unit) of the macroprocessor in FIG. 4A.

In FIG. 4B, 450 shows the key-features of the macroprocessor, described in 400 of FIG. 4A. Macroprocessor 450 comprises an instruction unit 451 that can receive instructions to execute. Instruction unit 451 is coupled to a data unit 452 to select the data required for hardware functional units to execute. Instruction unit 451 is further coupled to a control unit 453 to generate correct driver signals to move data between the required register files, and to generate control signals to configure or select the functionality of chosen hardware. Macroprocessor 450 comprises a first hardware function unit 454 that is commonly found in microprocessor hardware architectures. As an example, it may be an arithmetic and logic unit (ALU) or a floating-point unit (FPU). Macroprocessor 450 comprises a second hardware function unit 456 that further comprises user configurable logic and user configurable segmented interconnect that is commonly found in field programmable gate arrays. Hardware function unit 456 is defined as An FAU in this invention disclosure document. FAU 456 comprises a plurality of configuration bits 460. In a first embodiment, the plurality of configuration bits may be coupled to a memory unit 462, wherein a desired configuration is achieved by loading one or more data segments from memory unit 462 into the configuration bits. In a second embodiment the plurality of configuration bits may be coupled to a configuration circuit (not shown), wherein a desired configuration is achieved by loading the required data from a bitstream via the configuration circuit during boot-time. Memory unit 462 may comprise a plurality of coupling 461 to load the configuration bits 460 in one cycle, or in a plurality of cycles. Control unit 453 generate control signal(s) 463 to program FAU 456. Memory unit 462 may hold a plurality of data sets that can configure configuration bits 460, each data set providing a unique functionality to FAU 456. Control unit 453 configure the first hardware function 454 via control signal 465. In traditional microprocessors, this is a select signal issued by a decoder circuit in the control unit. As an example, an ALU may be selected to provide an XOR operation of two operands, or provide an ADD function of two operands by control signal(s) 465. Macroprocessor 450 comprises a configurable data-flow mixer 459, which comprises a plurality of configurable routing wires. It may receive data via bus 455 from ALU 454, and it may provide data via bus 457 to FAU 456. Mixer 459 is controlled by control signals 466 issued in control-unit 453 in response to one or more instructions in instruction unit 451. In a first embodiment, the mixer 459 comprises a configurable switch block that allows selective coupling between a plurality of register ports (a register port comprises a plurality of register inputs, or a plurality of register outputs). In a second embodiment the mixer 459 comprises a control-signal driven switching unit to direct data between a plurality of register ports. Thus, it is understood that HW function 454 may receive data from memory unit 452, or receive data from an output 458 of FAU 456. Similarly, FAU 456 may receive data from memory unit 452 using 467, or from an output 455 of HW function unit 454. Instruction unit 451 & control unit 453 ensures synchronization of data, data movement, and execution to achieve a valid result. Control unit 453 has a provision 464 to interact with FAU 456 that provides content processing.

FIG. 4B shows: a configurable processor unit 450, comprising: a computer processor unit (CPU) such as 150 in FIG. 1; and a configurable logic unit (CLU) 456 comprising a plurality of configuration bits 460; wherein, a first instruction received in an instruction unit 451 of the CPU is executed in a functional unit 454 of the CPU; and a second instruction received in said instruction unit 451 of the CPU is executed in the CLU 456. The CLU 456 further configured to execute a pre-determined function by configuring a plurality of configuration bits 460. The CLU 456 further comprising configurable look up table logic elements (not shown); and configurable segmented interconnects (not shown, inside 456); wherein a configuration bit pattern defines the logic functionality and the input to output connectivity of the CLU 456.

FIG. 4B shows: a heterogeneous compute unit (HCU) 450 comprising: a microprocessor; and a configurable logic unit (CLU) 456 comprised of a plurality of user configurable configuration bits 460 to program a user defined function. The microprocessor in HCU 450 further comprising: an instruction unit 451; and a hardware function unit (HFU) 454 coupled to the instruction unit 451; and a control unit 453 coupled to the instruction unit 454; wherein, an instruction in the instruction unit 451 is selectively executed in one of the HFU 454 and CLU 456. The CLU 456 in HCU 450 further comprising: a memory unit 462 coupled to the plurality of configuration bits 460; the memory unit comprising a plurality of stored data sets, one of said plurality of data sets configuring the CLU to define a user-defined function.

Figure 5A:
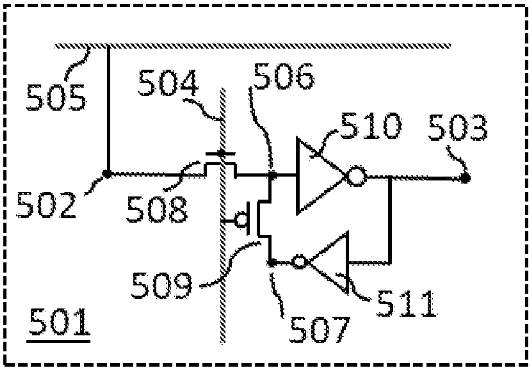
FIG. 5A shows an SRAM configuration memory element for use in the configurable hardware unit.

Single cycle and multi cycle function configurability of FAU 456 in FIG. 4B is described next. An exemplary 5-transistor (5T SRAM) configuration bit-cell 501 for use with FAU configurability is shown in FIG. 5A. The bit-cell 501 is configured via a select-line 504, and a data-line 505 orthogonal to said select-line 504. The data-line 505 is coupled to input node 502 of bit cell, and data state present on data-line 505 is latched into bit-cell 501 when select-line 504 is asserted (set to POWER supply voltage). Bit-cell 501 comprises a latch built with back-to-back coupled inverters 510 and 511. In a preferred embodiment, inverter 510 is stronger than inverter 511. In a finfet transistor process, inverter 510 may have 3-fin or 4-fin transistors; while inverter 511 may have 1-fin or 2-fin transistors. (Some technologies require a minimum of 2-fin transistors). In other embodiment, the configuration bit cell 501 may comprise 8 transistors (8T SRAM) or 10 transistors (10T SRAM). In bit-cell 501 NMOS transistor 508 provides access for data state in node 502 to couple to input node 506 of inverter 510. PMOS transistor 509 disconnect inverter 511 drive current that could oppose data write. When select-line 504 is de-asserted (returned to GROUND supply voltage), node 507 is coupled to node 506 to complete latch feed-back circuit. Output 503 of bit-cell 501 determine the configuration state of the bit-cell 501. That is coupled to the desired configurable element in FAU.

Figure 5B:
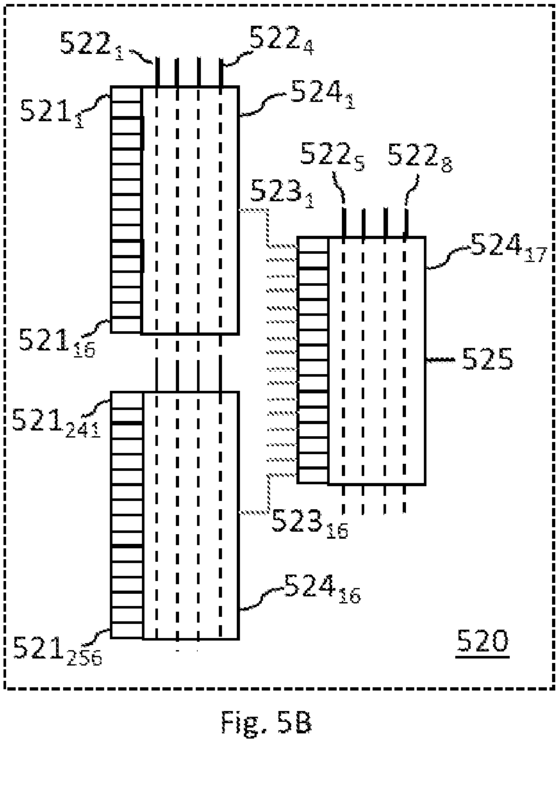
FIG. 5B shows an 8-input look-up-table (LUT) function constructed with 4-input LUT functions in a macroprocessor configurable logic tile.

FIG. 5B shows an 8-input look-up-table (8LUT) based function 520 constructed as 4 input LUT (4LUT) logic blocks 524. As an illustration, it is assumed that a very small FAU comprises a LUT function 520. An FAU may be a plurality of LUT functions 520. The eight inputs are labeled 5221-5228. Each input is received into a plurality of 4LUT blocks 524 in true and complement polarity (not shown). In 4LUT blocks 5241-52416, inputs 5221-5224 are common. A single 4LUT logic block 424 comprises 16 configuration bits, such as 500 in FIG. 5A. Cumulatively there are 256 configuration bits in the first 16 stages of 4LUT blocks 5241-52416. These 256 configuration bits store LUT values that define the LUT function. Every combination of 8-Input functions can be implemented by appropriate 256 LUT values. Therefore, there is an incredible 2252 number of state functions that can be generated by just changing 256 LUT value. Each 4LUT block 524 generates a single output 523, and the 16 4LUT outputs are labeled 5231-52316. The 16 first stage 4LUTs have 256 configuration memory elements 5211-521256, only the first and last shown in FIG. 5B. These first stage 4LUT outputs are fed into second 4LUT stage 52417 as the 16 4LUT values. Inputs 5225-5228 are common in the second stage. LUT function 520 generates a single output 525. In this example, only LUT values can be changed to create different functions of 8 input variables. Generating a truth table for the 8-input function defines the 256 LUT values needed. There is no segmented wire connectivity required in this method of function reconfigurability; we need to alter the LUT values when a different LUT function is needed. The construction of configuration bits in an array favors single cycle or multi cycle configurability.

Figure 5C:
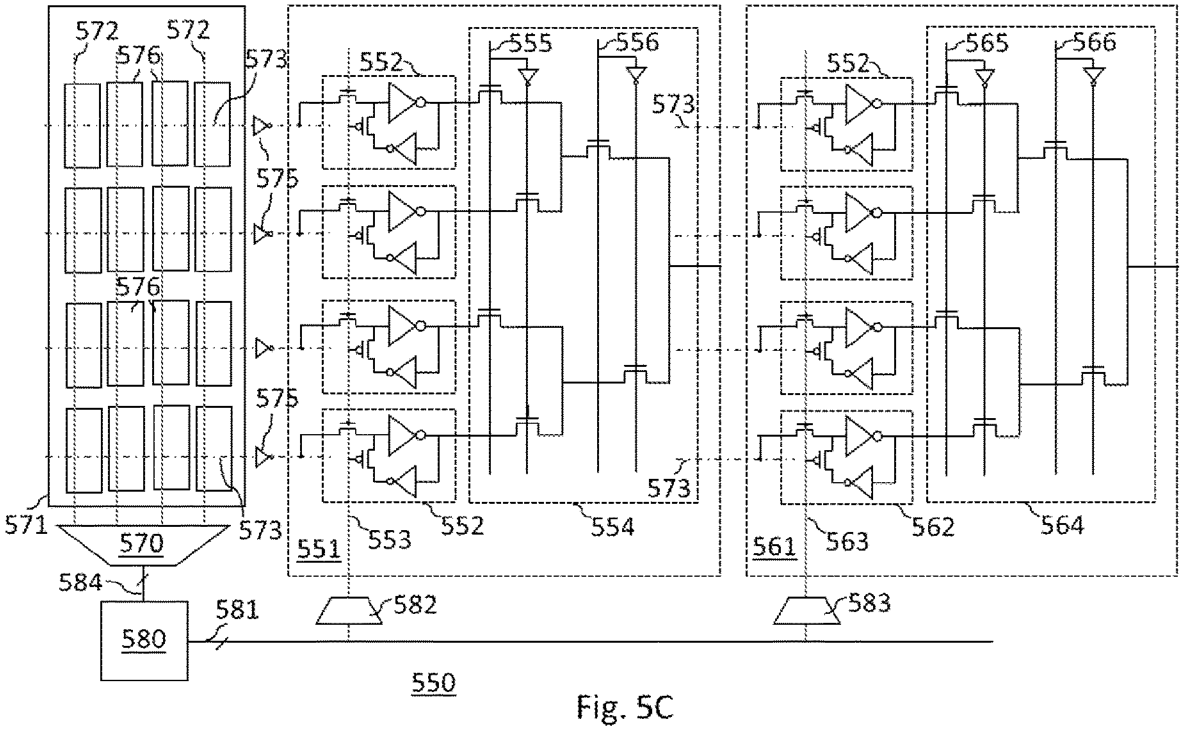
FIG. 5C shows hardware structures to dynamically reconfigure the configurable hardware unit by stored memory values in the macroprocessor.

In 550 of FIG. 5C we show a construction of memory unit 462 and a portion of controller unit 453 in FIG. 4B, where FAU 456 configuration bits are replaced by bit-cell 501 in FIG. 5A, and FAU 456 configurable logic (not shown) is replaced by LUT logic 520 of FIG. 5B. Control unit is labeled 580, and it is able to generate control signals to match instruction intent. Only a LUT slice of 4 configuration bits is shown in 550, and we would need 64 such slices to make the 256 configuration bits for 8-input LUT function. We only need 16 LUT values for one 4LUT function. Memory unit 571 is constructed as a standard row-column array of memory-cells 576. All memory-bit values in one selected column 572 is written into all row-lines 573—these act as data-lines for configuration bit-cells 552 and 562. There are 256 values read in this example by selecting one column line 572. The control unit 580 generates the decoding signal on bus 584, and a decoder logic selects the desired column. The memory cell outputs 573 may be buffered by drivers 575. This memory output data feeds all 256 configuration bits in parallel in a first FAU 551, and a second FAU 561 (a plurality of FAUs). By asserting one of the select-lines 553 (or 563), all 256 data-values are latched into configuration bit-cells 552 and 562 in a chosen FAU 551. This can be done in one cycle. It is easy to visualize that up to 1024 memory output values may be accessed in Memory-Unit 571 in one cycle. If there is a need to load 1M bit-cells—this can be done sequentially in 1000 cycles of 1024 bits in each cycle. To dynamically re-configure all needed LUT values, in one or more cycles, we can read the needed stored memory values and write those into configuration bits. In FIG. 5C, 554 & 564 are 2-input LUTs with input pairs 555/556 and 565/566 respectively, 570 is the (Address-LSB) input decoder to memory array 571, 581 is the Address (and bus) for control unit 580, and decoders 582 & 583 decode the LSB of Address 581.

Figure 5D:
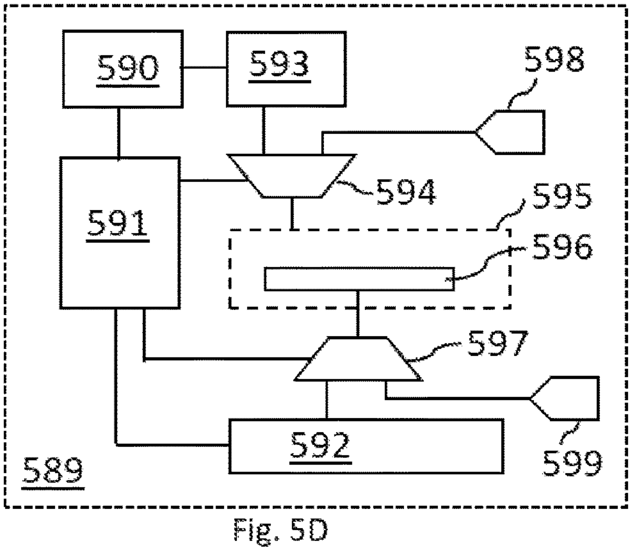
FIG. 5D shows a functional view of a configurable compute processor.

In FIG. 5D, 589 represents a functional view of the user configurable compute processor described in FIG. 5A to FIG. 5C. Configurable compute processor 589 comprises: a plurality of instruction registers 590; and a configurable logic unit 595 further comprising a plurality of configuration bits 596 for a user to customize a logic function; and a control unit 591 coupled to the instruction registers 590 to selectively configure the configuration bits 596 from one of a memory unit 592 and a data input means 599 controlled by control unit 591 through MUX 597 in response to an instruction from the instruction registers 590.

Configurable compute processor 589 comprising: a plurality of instruction registers 590; and a configurable logic unit 595 further comprising a plurality of configuration bits 596 for a user to customize a logic function. Configurable processor 589 further comprising: a control unit 591 coupled to the instruction registers 590 to select compute input data for the configurable logic unit 595 from one of a plurality of data storage choices such as 593 and a data input means 598 controlled by control unit 591 through MUX 594.

Configurable compute processor 589 comprising: a plurality of instruction registers 590; and a configurable logic unit 595 further comprising a plurality of configuration bits 596 for a user to dynamically customize one logic function from a plurality of logic functions, each function defined by a configuration bit dataset. The compute processor 589 further comprising: a memory unit 592 to store the plurality of configuration bit datasets; and a control unit 591 coupled to the instruction registers 590 and the memory unit 592 to dynamically select one of said configuration bit datasets in response to an instruction from the instruction registers 590.

Configurable compute processor 589 comprising: a user configurable logic unit 595 further comprising a plurality of configuration bits 596 to customize a user defined function by loading data into configuration bits; and an instruction registers 590 coupled to a control unit 591 to execute a customized user defined function in the configurable logic unit.

Bit-Byte Configurability of FAU 456 in FIG. 4B is described next. As described in FIG. 2 (A & B) prior art FPGA fabrics are designed to work with Bit-Level configurability. In FIG. 2, configurable input (251) & output (265) routing is at bit-level, configurable multiplexers (255, 256) are at bit-level, and LUT-values 266 are bit-level. In FIG. 2, configurable switch-blocks and configurable connection-blocks that couple tiles 250 have bit-level configurability, details of it not shown in the diagram. Bit-level configurability takes up area, but offers better connectivity in FPGA's. Microprocessor hardware architectures (HWA) work on Bus-Width- and those can be 8-bit, 16-bit, 32-bit, 64-bit up to 128 bits in modern day computers. There needs to be Bit-Byte configurability in FAU 456 (FIG. 4B) to optimize macroprocessor hardware architectures.

Figure 6A:
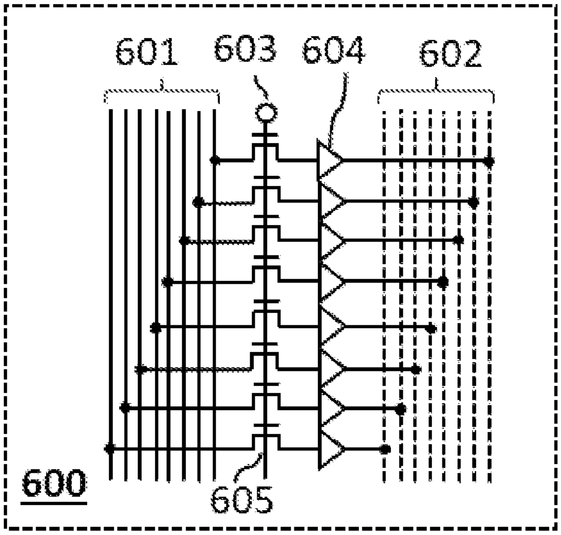
FIG. 6A shows a byte configurable switch in configurable CPU pipelines.
Figure 6B:
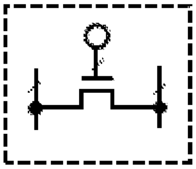
FIG. 6B shows the symbolic view of the byte configurable switch in FIG. 6A.

A byte-configurable switch 600 is shown in FIG. 6A. Byte configurable switch 600 comprising: a first plurality of wires 601; and a matching number of wires in a second plurality of wires 602; and a matching number of pass gates 605, each pass gate uniquely coupling a wire in the first plurality of wires 601 and a wire in the second plurality of wires 602; and a single configuration bit 603 that enables coupling or decoupling between the two pluralities of wires. Wire signals are buffered by drivers 604. Byte configurable switch 600 comprises: a first bus 601; and a second bus 602 of matching bus width; and a set of pass gates 605 configurable by a configuration bit 603 to couple or decouple the two busses. Setting the single configuration bit 603 allows a byte-wise bus connection. In FIG. 6A, an 8-wire bus is shown for illustrative purposes. This can be a bus of any width of 2 or more wires. In some embodiments, it may be beneficial to use 2 wires, or 4 wires to form buses that can be configured with one configuration bit. For an 8-bit bus, using 1 configuration bit in byte-configurable switch 600 save 7 configuration bits compared to a bit-configurable switch. It is cheaper, and improves performance (less wire delay due to area reduction). A symbolic representation of the configurable byte-switch in FIG. 6A is shown in FIG. 6B. In another preferred embodiment, the configuration-bit 603 of the byte-switch 600 is replaced by a control-signal generated by control unit 591 in FIG. 5D. It is easier to generate a single control signal.

Figure 6C:
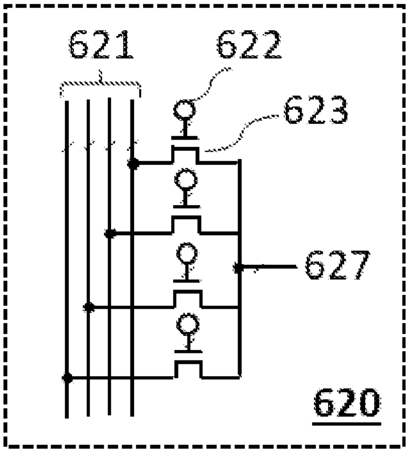
FIG. 6C shows a byte configurable multiplexer in configurable CPU pipelines.
Figure 6D:
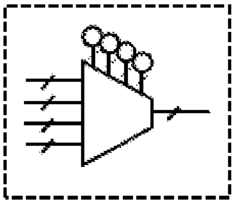
FIG. 6D shows the symbolic view of the byte configurable multiplexer in FIG. 6C.

A byte-configurable multiplexer 620 is shown in FIG. 6C, and its symbolic representation is shown in FIG. 6D. Byte configurable multiplexer 620 comprising: a plurality of input buses 621, one of said input bus 621 further comprising a plurality of wires, all of said plurality of buses 621 having the same number of wires; and a plurality of configurable switches 623, one of said plurality of configurable switches further comprising a configurable bit 622, and the configurable switch providing a means of coupling one of said plurality of input buses 621 to an output bus 627; wherein the output bus 627 has the same number of wires as one of said plurality of input buses. Configuring one of the configuration bits to a connect state, and remaining configuration bits to a disconnect state, couples one of the input buses in bus group 621 to multiplexed output 627. In another preferred embodiment, the plurality of configuration-bits 622 of the byte-multiplexer 620 is replaced by control-signals generated by control unit 591 in FIG. 5D.

Figure 6E:
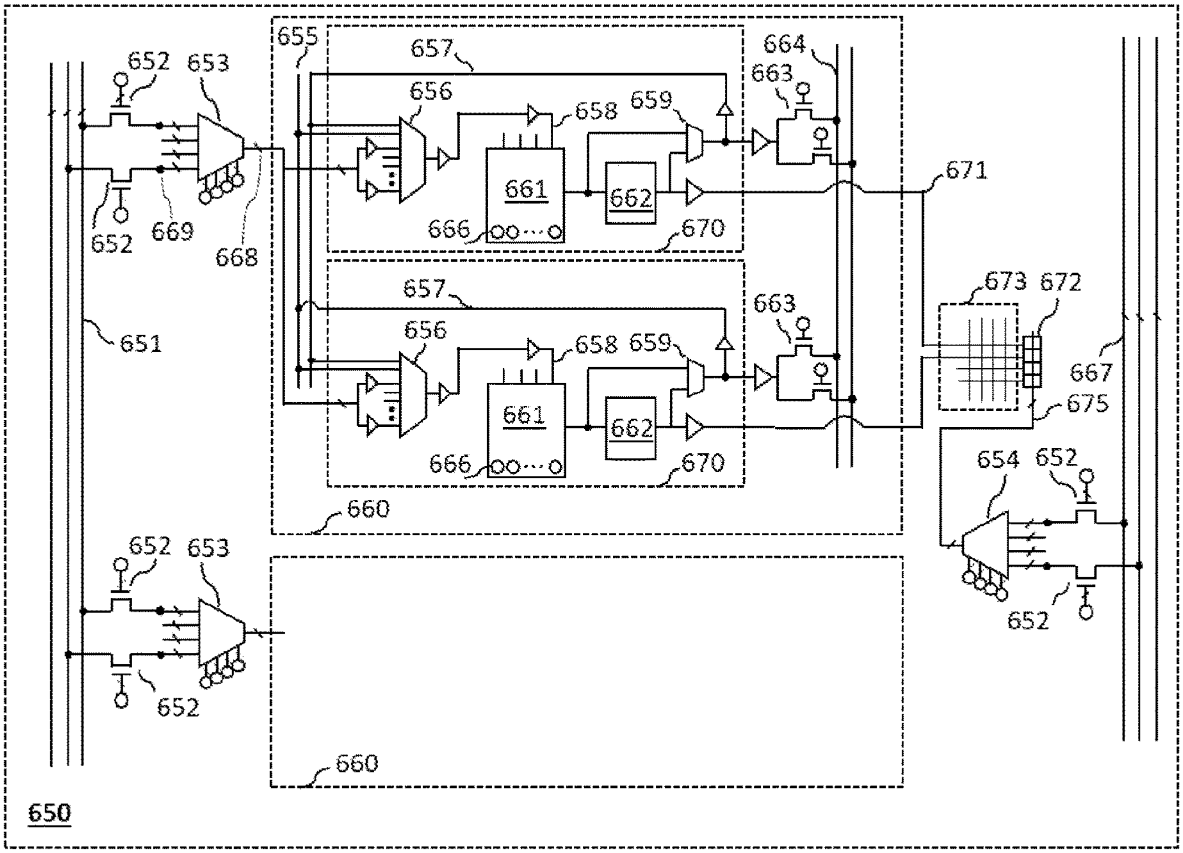
FIG. 6E shows a Bit-Byte segment of a configurable logic tile in a configurable CPU pipeline.

A detailed Bit-Byte configurable segment of an FAU, a configurable logic tile (CLT) 650 (FAU is shown as 456 of FIG. 4B) is shown in FIG. 6E. Bit configurable is defined as a single configurable bit affecting a bit-level connectivity, including a first wire segment coupling to a second wire segment. Byte configurable is defined as a single configurable bit affecting a byte-level connectivity, including a first plurality of wires coupling to a second plurality of wires of same dimension. Thus, byte configurability refers to bus coupling, while bit configurability refers to individual wire connectivity. This is done to save configuration bits and area in FAU HWA and to improve performance. CLT 650 in FIG. 6E is a segment of a configurable logic unit. FIG. 6E makes use of the symbolic representations of Byte-Switch in FIG. 6B and Byte-Multiplexer in FIG. 6D. The CLT 650 has a plurality of buses 651 for input signals and a plurality of buses 667 for output signals. All buses have a common denominator bus width that has the same number of wires. As an example, 24-wide bus can be viewed as 3× 8-width buses, and a 32-wide bus can be viewed as 4× 8-width buses. By extending these arguments, we can use an 8-width first Byte-Configuration to select which 8-wires we want (out of a plurality of 8-wire bus groups), and use a 4-width second Byte-Configuration to separate the 4-LSB and the 4-MSB in 8-bit wires into two-halves; in fact, we can subdivide the 8-bits into any other combination of bits such as (1b+7b), or (2b+6b), etc. This is useful in MSB encoding techniques used in data compression. For this discussion, we use a bus-width of 8-wires. It could be any other number of wires as defined by the microcomputer HWA, or determined by a software tool for data movement. CLT 650 may have multiple hierarchies of configurable content with increasing granularity or density. Lower-level logic elements are concatenated to build higher-level logic functions. At the lowest level, CLT 650 has a bit configurable logic element (CLE) 670, comprising at least a look-up-table (LUT) function 661 and a register 668. We can construct a CLE 670 to have 2 4LUTs and 2 registers, or 2 4LUTs and 1 register, or 1 6LUT and 2 register, or any other number of N-LUT & register combinations. The LUT 661 shown in the diagram is a 4-input LUT, having 4-inputs such as 658, written as a 4LUT. LUT function could have any other number of inputs (for example a 6LUT has 6 inputs), and it could be a group of many other programmable logic elements that comprise gates and multiplexers. Shown 4LUT 661 has 16 (=24) configuration bits 666, the bit values defining 4LUT logic function. Register 662 (may be a D-flip-flop, an SR-flip-flop, or any other) can be used to register the output of 4LUT 661, or by-passed using a bit configurable multiplexer 659. LUT 661 output can be fed back as an input to the same CLE 670, or a different CLE 670 in a local cluster of CLE's, via the feed-back wire 657 and multiplexer 656. CLE 670 operates at bit-level configurability. At the next higher level of granularity, a plurality of CLE's 670 make up a bit configurable logic block (CLB) 660. There may be more than two CLE's in a CLB 660, but in FIG. 6E we show only 2 CLE's as an example. In other embodiments, we may have 4 CLE's 670 in one CLB 660, or 8 CLE's in one CLB 660. Outputs of each CLE 670 may be selectively fed back as inputs to all CLE's in one CLB. For example, we may use 2 or 4 feed-back wires, and selecting 2 or 4 of the N possible CLE outputs (for N-CLE's in CLB) to be available as shared inputs to all CLE's. One such intra-CLB common input to CLE's is 655. This is a bit configurable local feed-back. MUX 656 is also bit-configurable. FIG. 6E shows only 3 levels of granularity, with a plurality of CLB's 660 forming the CLT 650. Outputs are routed through bit configurable switches 663 to local routing wires 664 so that selected outputs are shared by a plurality of CLB 660 as inputs. These wires provide CLB to CLB connectivity, whereas wires 657 provided CLE to CLE connectivity. It is advantageous to have a plurality of CLT's 650, a plurality of memory blocks, and a plurality of DSP units constitute An FAU 456 in FIG. 4B.

Logic construction within CLE 670 occurs at a bit-level connectivity (multiplexers 656, 659) & function programming (LUT values 666). Each of registers 662 has an individual registered value. Logic functions are generated by a synthesis & logic placement tool, thus which register is used and which is by-passed is not known. This prevents bus-connectivity in FPGA fabrics. A new concept to provide bus-connectivity in a configurable fabric is disclosed next. First a register file 672 is provided within CLT 650 to facilitate bus connectivity from a Tile 650. Register outputs are routed to a special configurable connection block 671 that has bit configurability to facilitate output 671 selection. A register output 662 can be coupled to one of the available register inputs in 671. The cross-point matrix configurability allows any ordering of registers to be aligned into register file 672. In logic functions, we can selectively pick a group of "desired" registers that constitutes a bus-width and couple those to register file 672. The register file outputs 675 form a bus having a bus width that match the register file width. This Tile 650 output bus 675 is routed to one of a plurality of output buses 667 via byte-configurable multiplexer 654. It may include an optional byte-configurable switch 652 so that the input 651 and or output 667 bus connectivity can be dynamically controlled by a control-unit.

In FIG. 6E, configurable logic tile 650 comprises: a plurality of bus interconnects 651, each bus interconnect 651 having a plurality of wires; and a configurable logic block 660 having an input bus 668 having a plurality of wires Logic tile 650 comprising: a configurable switch 652 having a configuration bit or a control signal to facilitate each of the wires of a plurality of bus interconnects 651 to respectively couple to an input bus 669 of a multiplexer 653 coupled to the bus 668. Switch 652 may be operated in static mode or dynamic mode. In FIG. 6E, configurable logic tile 650 comprises: a configurable multiplexer 653 comprised of: a plurality of input buses 669, each of said input buses comprising an identical number of wires; and an output bus 668 comprising an identical number of wires to a said input bus; and a plurality of configuration bits, a said configuration bit facilitating each of the wires of one of said input buses 669 to respectively couple to all the wires of said output bus 668 by configuring the said configuration bit. In summary, configuration logic tile 650 comprises a byte-configurable switch to couple all wires of a bus input 651 to a matching number of logic tile inputs 668 using a single configuration bit. Furthermore, configuration logic tile 650 comprises a byte-configurable multiplexer 653 to couple all the wires in one selected bus from a group of many buses to a matching number of logic tile inputs 668 by programming the plurality of bus configuration bits.

In FIG. 6E, configurable logic tile 650 comprises: a register file 672, each register comprising a register input; and a plurality of configurable logic elements 661, each logic element comprising a register 662 to store one of said logic function output value, the register 662 comprised of a logic register output; and a configurable connection block 671 made up of routing wires, one of said wires capable of coupling to an output of one of said logic register 662; the configurable connection block 671 further having a plurality of configuration bits to facilitate one of said logic register 661 output to couple to one of said register file 672 input. In FIG. 6E, configurable logic tile 650 comprises: a register file 672 to store a plurality of configurable logic function outputs 661; and a configurable routing arrangement (671, 672, 675, 654, 652) further comprising a plurality of configuration elements to couple a plurality of outputs of said register file to an interconnect bus 671 comprising a plurality of wires.

Logic tile 650 receives input data in a bus routing interconnect structure, computes logic in a configurable logic block comprised of configuration memory using a bit routing interconnect structure, and provide output data back in a byte routing bus structure. Logic tile 650 comprises a bit-byte programmable interconnect structure. Logic tile 650 comprises a dynamic configurability 652.

Macroprocessor 400 in FIG. 4A has a mixer circuit (a data router) 419 that is capable of coupling outputs of one or more configurable FAU 418 sub-unit outputs and the outputs of one or more microprocessor hardware units 408-411 (collectively termed macroprocessor hardware units) for data bypass needed in auto-pipelining. Software synthesis tool and a compiler can generate linking instructions for sequential functions in the mixer 419 so the output of a first function is pipelined into the input of a second sequential function without incurring cycle penalties (known as bubbles). The mixer circuit is described next.

Figure 7A:
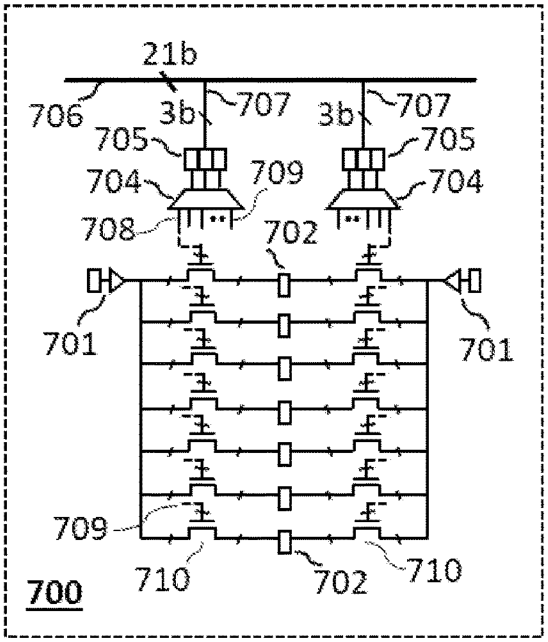
FIG. 7A shows a first embodiment of a configurable mixer circuit in a configurable CPU pipeline.
Figures 7B, 7C:
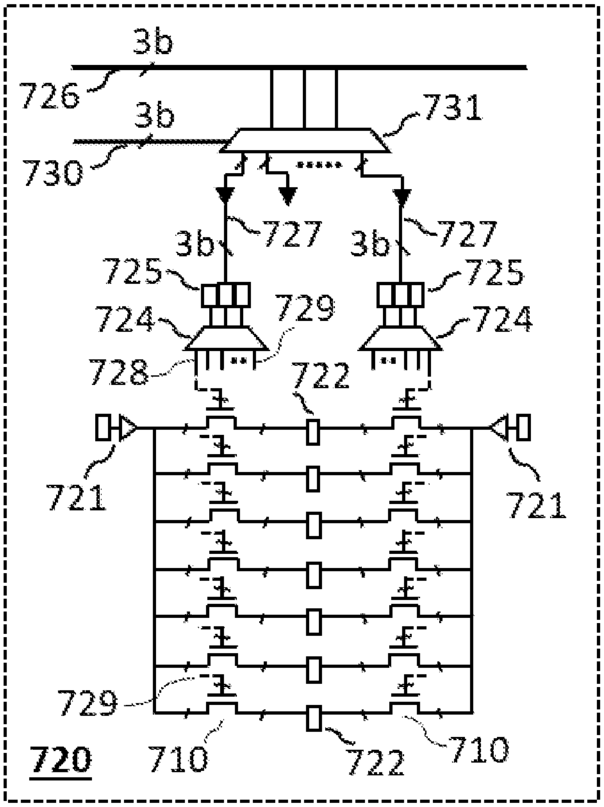
FIG. 7B shows an exemplary 3-bit code generator outputs to program the mixer circuit in FIG. 7A.
FIG. 7C shows a second embodiment of a configurable mixer circuit in a configurable CPU pipeline.

A configurable mixer circuit 700 is shown in FIG. 7A. This is shown as 419 in FIG. 4A, wherein a controller unit 404 generates control signals to configure mixer 419, the control signal labeled 706 in FIG. 7A. The bus width for control signal 706 depends on how many ports the mixer serves to route data. A port is defined as a plurality of nodes. For an 8-bit bus, a port comprises 8-nodes (inputs and/or outputs), and an 8-wide bus is needed to couple ports; and for a 16-bit bus, a port comprises 16-nodes (inputs and/or outputs), and a 16-wide bus is needed to couple ports. Each node has a signal data state. Mixer 700 uses byte-configurable bus structure described in FIG. 6 with one exception: the configuration bit 603 in FIG. 6A is replaced by a configuration signal generated by control unit such as 404 in FIG. 4A. To couple 7-input nodes & 7-output nodes, mixer 700 comprises 7 byte-configurable bit-code generators 704. Each bit-code generator 704 receives 3-bits 705 as inputs from the control-unit over the bus 707. With 4-bits, we can serve 15-wide (24-1) mixer port connectivity. The illustration shows 7 input and seven output nodes serviced by the mixer 700. Control signal 706, in this example, must carry 21-bits to feed 7 3-bit code generators 704 in 1-cycle. We would need 60-bits to serve 15 4-bit code-converters. Code converter 704 has eight output states defined by the 3-bits. The MSB is not used, remaining 7 bits are used to control each of a plurality (=7 in FIG. 7A) of pass-gates that couple output node 701 to a plurality of input nodes (7 in FIG. 7A) 702. A code generator output, such as 708 & 709, is coupled to a unique pass-gate. The code-generator output has 8 states. Pass-gate elements 710 are programmed by the code generator outputs such as 708/709. These states are shown in FIG. 7B. A first 3-bit state tri-states all port connections. Each of the remaining 7 states couple one input-port (from plurality of 702 ports) to one output-port (from plurality of 701 ports. Not all 7 ports are shown in FIG. 7A. A driver located in output ports 701 helps drive the signal data at output port to an input port. In a preferred embodiment, a register output defines a node. A plurality of register outputs forms a register-file at an output port. A plurality of register inputs may define an input port.

The bus width for all seven 3-bit converters to configure Mixer 700 in 1-cycle needs a 21-wide control signal bus 706. It is a lot more economical to use a 2-cycle configuration for the 7-port Mixer 720 as shown in FIG. 7C. It reduces the control-signal bus width significantly from 21-wires to 6-wires. In FIG. 7C, elements 724, 727, 728 & 729 are identical to FIG. 7A elements 704, 707, 708 & 709 respectively. Two control-signals are required: a first 3-bit control signal 726 transmits data-values for the 3-bit code-generator. It is received by a byte-configurable multiplexer 731 (the 3-bit inputs shown in the diagram). Multiplexer 731 receives a second control signal 730 comprising 3-bits (or 3-wires). The 3-bits facilitate coupling of 3-bit data values in bus 726 to one of seven 3-bit register groups 725, thereby reconfiguring the port connections. However, this re-configuration requires a special programmable means as we cannot have two output drivers trying to drive signals to the same input. In this embodiment, it is avoided by a two-cycle input port re-configuration. Note that only two states exist at any input of a single Mixer 720: (i) the input port 722 is tri-stated (not driven by a Mixer output); or (ii) the input port 722 is driven by a Mixer output port 721. If the input port 722 is driven, it is turned off in a first cycle by shifting the 3-bit tri-state code from the appropriate bit-code generator. If the input port is not driven, we don't have a conflict. A single output driver driving the same signal to two different input ports does not cause a conflict if the driver strength is appropriately designed. It is always possible to use an extra cycle to ensure that an output driver only drives to a single input port too by shifting in the bit-code to turn it off input ports first. In the embodiment 720 in FIG. 7C, we only need 6-wires for the two control signals 726 & 730, whereas we needed 21 wires in 700 of FIG. 7A. Had we use a 4-bit example (15 port connections) as an illustrate in FIG. 7C, we would have needed only 8-wires in the two control-signals 726 & 730 compared to 60-wires we would have needed with FIG. 7A construction.

A configurable data router 700 comprising: an output port 701; and a plurality of input ports 702; and a configurable means of coupling the output port to one of said input ports. The configurable data router 700, wherein the configurable means comprises a control signal 706 received from a control unit. The configurable data router 700, wherein the configurable means comprises a plurality of configuration bits 705. The configurable data router 700, wherein the output port 701 further comprising a plurality of nodes. The configurable data router 700, wherein the input port 702 further comprising a plurality of nodes. The configurable data router 700 further comprising a means of receiving a bit-code 705 and generating a plurality of select signals 708 to enable one of: decouple all the ports from each other, and selectively couple output port 701 to one of a plurality of input ports 702.

A configurable data router 700 comprising: an output port 701 comprised of a plurality of nodes; and an input port 702 comprised of a plurality of nodes matching the plurality of output port nodes; and a control signal bus 706 to receive a plurality of bit values to couple or decouple the plurality of nodes in output port 701 from the plurality of nodes in input port 702. The configurable data router 700 further comprising: a bit-code generator circuit 704 that receives a plurality of bit values 705 from a control signal bus 706 to generate a plurality of gate signals 708, each said gate signal capable of coupling or decoupling the output port 701 from one of said plurality of input ports 702.

A configurable data router 720 comprising: a configurable means of coupling a set of output ports 721 to a set of input ports 722, the configurable means comprised of: a first control signal bus 726 to receive configuration data; and a plurality of configuration bit sets 725 to program output ports 721 and input ports 722 coupling; and a second control signal bus 730 to receive decode data to select which configuration bit sets is programmed by the configuration data received on the control signal bus 726. The configurable data router 720, wherein a clock signal latch the control signal 726 data into the decode selected configuration bit sets 725. The configurable data router 720, wherein the configuration bit sets are cyclically written to ensure that an input port 722 is never coupled to two output ports 721 at any time during configuration. The configurable data router 720, wherein the configuration bit sets 725 are written in a plurality of cycles to ensure a tri-state condition at the input port to decouple the input port form all output ports prior to coupling the input port to the desired output port.

Using FIG. 5, we disclosed how functions can be modified dynamically in FAU 418 in FIG. 4A. We stated that dynamic configurability of wires is not feasible in prior art as in FIG. 2 as the configuration bit reconfiguration could cause device damage due to contention. In FIG. 2, the configuration bits are arranged in an X-Y grid so that configuration circuits may write data during boot-time into the configuration bits similar to writing data into a memory array. While this is possible during boot time since there is no functional performance in user circuits, during run time when all circuits are dynamically active, drivers could clash leading to damage. A single cycle dynamically reconfigurable interconnect fabric that couples output drivers to input receivers is disclosed next.

Figure 8A:
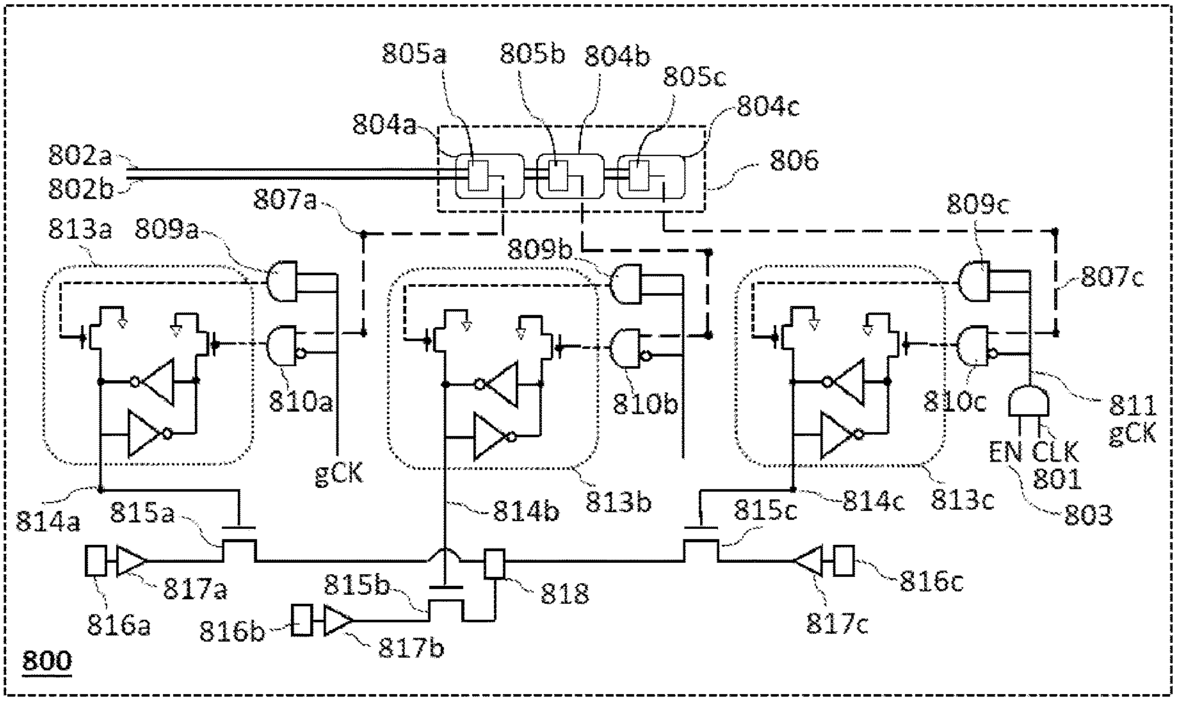
FIG. 8A shows a first embodiment of a dynamically reconfigurable interconnect structure in a configurable CPU pipeline.

Device 800 in FIG. 8A shows a "single cycle" dynamically reconfigurable interconnect structure. It comprises an enable signal 803 to gate a clock signal 801 and generated gated-clock signal (gCK) 811 to achieve a single-cycle re-configurability while preventing driver 817*a*-817*c* contention during that reconfiguration time. The structure 800 is named a dynamic router. In this example, a plurality of special configuration elements 813 comprised of a latch and two ground connected pass-gates is used. Config element 813 has a set state and a reset state. During the set state, the latch output 814 coupled switch 815 is at an ON=1 state; while in reset state switch 815 is at an OFF=0 state. Either state is programmed into the latch by activating a ground connected pass-gate, only one desired pass-gate activated at any one time. When logic 809 generates an ON signal, the latch enters reset state. When logic 810 is activated, the latch enters set state. When neither 809 or 810 is activated, the latch retains its previously stored state.

A control signal 802 comprising a plurality of bits (802*a*, 802*b*) is received by a bit-code decoder unit 806, which has 3 decoded outputs 807*a*, 807*b* (the output of 805*b*, label not shown) and 807*c* to program the dynamic router 800. There may be more than 2 decode bits depending on the number of decoded outputs needed for programming configurable elements in 800; N-bits can configure ($2^N$-1) config elements. For two decode-bit values 802*a* & 802*b*, the bit-code decoder logic units 804*a*-804*c* generate a programming signal for a set-state of a configuration elements 813. Logic blocks 805*a*-805*c* provides this single programming signal by correct logic outputs on 807*a*-807*c*. As an example, let us say the two bits received on 802*a* and 802*b* are A, and B. Logic block 804*a*-804*c* outputs are: 807*a*-NotA*B; 807*b*=A*NotB; 807*c*=A*B; and TriState=NotA*NotB, where all 3 signals 807*a*-807*c* are at Zero. We can write the decode-bit & decoded-output vector pairs as: (00, 000), (01,100), (10, 010), (11, 001).

The dynamic router 800 comprises 3 output nodes 816*a*-816*c* capable of coupling to input node 818, each comprising a driver 817*a*-817*c* to transmit a signal at that node. In this example, all 3 output nodes are able to dynamically couple to input node 818 by a programmable means that comprise configuring pass-gate switches 815*a*-815*c* ON or OFF. Only one of the three pass-gates switches are active at any time instance. There are 3 configuration bits, or storage elements, 813*a*-813*c* to hold the data to configure the 3 switches 815*a*-815*c*. The output values of storage bits 813*a*-813*c* are written as xyz (x=814a, y=814b, z=814c). There are 4 states of output-input coupling: (i) tri-state 000 when none of the outputs are coupled to input 818; (ii) first-state 100 when output 816*a* is coupled to input 818; (iii) second-state 010 when output 816*b* is coupled to input 818, and (iv) third-state 001 when output 816*c* is coupled to input 818.

Programmable means of configurable storage elements 813*a*, 813*b* and 813*c* comprise an operational sequence to not allow two or more outputs 814*a*-814*c* reach logic state 1 simultaneously to prevent driver contention. This is achieved by ensuring a tri-state condition to precede a dynamic reconfiguration within the same re-configuration cycle by the use of an enable signal 803 (issued by a control unit to generate the gated-clock signal 811). All storage elements use the gated-clock signal 811 to facilitate reset and set states of storage. When EN signal 803 is deactivated (i.e. EN=0, signal gCK 811=0), output logic of 809 & 810 decouples storage elements 813 data write paths to retain previously stored data. The feed-back inverters in the latch in 813 retains the data it already has regardless of CLK polarity. When a programming is needed, EN signal 803 must be activated with correct sequencing with CLK cycle. In the shown config element 813: reset is achieved by +ve CLK edge, and EN must precede this edge by a required setup-margin; and set is achieved by −ve CLK edge, and EN must be held past this edge by a required hold-margin. When EN signal 803 is activated (i.e. EN=1), when CLK=1, gCK=1; when CLK-0, gCK-0. When gCK=1, 809 logic reset ALL configuration elements 813*a*-813*c* to outputs 814-0. Logic in 810 disable the set-path of storage elements 813.

Grounded source reset transistors in storage element 813 are sized to write a ZERO at the grounded node. The net result is when EN=1, the first half of gCK=1 cycle will tri-state all the drivers in dynamic router 800. During the second half of gCK-0 cycle, the reset path is disabled by logic in 809, while set path is abled by logic in 810 subject to decoded outputs 807*a*-807*c*. Only one of those signals will have a 1-state, and that will select set-state of one of the bits 813, while the remaining two bits in 813 will hold their reset states. All configuration elements are reconfigured in one-cycle. The programmable means comprises EN signal returning to ZERO state during CLK=0 half of cycle after programming the configuration bits, before the next +ve edge of CLK pulse. This is a tight window of operation. Keeping the EN=1 will force the configuration bits to continuously cycle through reset-state, and set-state every CLK cycle, which is undesirable. The dynamic-router 800 is now reconfigured to operate correctly from the next cycle onwards, until another reconfiguration is initiated. What we described is to dynamically reconfigure a driver connection to a receiver in 1-cycle, so it can be used in the next cycle, without having driver contention during reconfiguration.

Figure 8B:
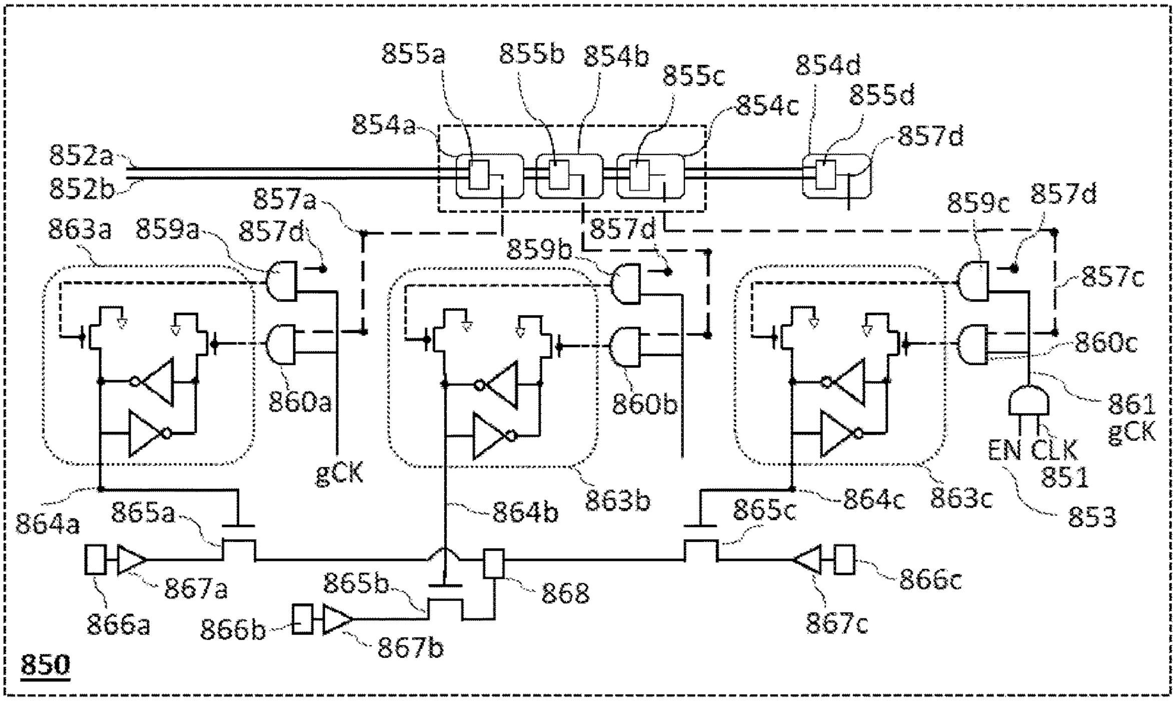
FIG. 8B shows a second embodiment of a dynamically reconfigurable interconnect structure in a configurable CPU pipeline.

A two cycle dynamically reconfigurable router (or interconnect structure) 850 is shown in FIG. 8B, in which a programmable means to configure the router requires an Enable 853 control signal synchronization to ONLY the positive edge of a CLK 851 signal (as opposed to dynamic router 800). Many elements in FIG. 8B are common with FIG. 8A: 854*a,b,c*=804*a,b,c*; 855*a,b,c*=805*a,b,c*; 859*a,b,c*=809*a,b,c*; 864*a,b,c*=814*a,b,c*; 865*a,b,c*=815*a,b,c*; 866*a,b,c*=816*a,b,c*; 867*a,b,c*=817*a,b,c* & 868=818 respectively. EN 853 signal must precede a clock signal 851 rising edge by a setup margin, then held high for a hold-margin after the next CLK 851 falling edge. EN-0 forces gCK 861 to 0 to prevent configuration bits 863 disturb during CLK cycles when no reconfiguration is desired. When control signal bits 852*a* (=A) & 852*b* (=B), the tri-state condition is achieved via a logic block 855*d* that generates 854*d*=NotA*NotB. Output 857*d* is coupled to all configuration elements 863. When A=B=0, 857*d*=1, and 857*a*=857*b*=857*c*=0. Signal 857*d* drive all logic gates 859 to program reset-state in all three config bits 863 during first gCK=1 cycle. Signals 857*a*-857*c* at 0-level ensure all logic 860 outputs=0, shutting off the set-state paths. To reconfigure configuration bits 863, EN must be selected (EN=1). If EN=0, the latches will retain their previous data. There are two reconfiguration paths: a reset-state path via logic 859, and a set-state path via logic 860. The choice of programmed config element 863 to be in set-state is selected by the bit values AB in control signal 852. When a reconfiguration is desired, control signal 852 is set to A=B=0 ahead of a reconfiguration CLK pulse, and ahead of EN signal. Then EN=1 is selected, and when the CLK is pulsed, gCK is also pulsed. During gCK=1 half cycle, all 3 configuration elements 863 will get output 864=ZERO, reset-state, tri-stating the dynamic router 850. During gCK=0 half of same pulse, config-elements 863 retain their reset-state. Now control-signal 802 bit values AB are selected to program the desired configuration into 863, maintaining EN=1. Say we selected AB=10 which should program "100" configuration into config elements 863. Bit-code decoder outputs 857*a*-857*c* are 100 in response to bit-code AB=10. During the second CLK cycle, gCK config-bit 863*a* will enter set-state due to 860*a* logic output, while remaining config-bits 863*b* & 863*c* will remain at reset-state due to 860*b* and 860*c* logic outputs. No two drivers 867 will be active at one time due to the tri-state transition between configuration. After the second CLK=1 half cycle, EN is returned to EN=0 to turn gCK=0, and disable CLK signals modifying config-elements 863. The programmable means of dynamic router 850 has an inbuilt configuration means to avoiding contention during this 2-cycle reconfiguration.

Figure 8C:
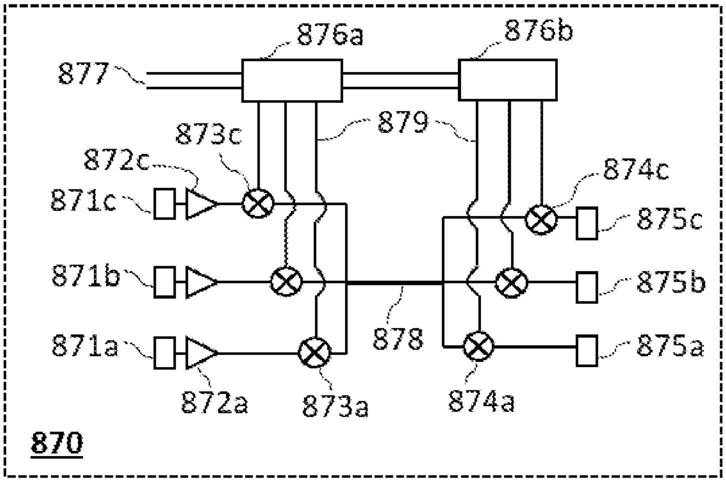
FIG. 8C shows a functional diagram of the node-to-node router in the interconnect structures of FIG. 8A & 8B.

A bit-level configurable node-to-node dynamic router 870 according to the descriptions provided in 800 & 850 is shown in the functional block diagram of FIG. 8C. A plurality of output nodes 871 shown as 871*a,b,c* can be configurably coupled to a plurality of input nodes 875 shown as 875*a,b,c* using a plurality of switches such as 873*a,c* & 874*a,c* and a common wire 878, the programmable means comprising: a plurality of configuration elements (in 876*a* & 876*b*); and a programming sequence to program the configuration elements to avoid driver contention during the dynamic reconfiguration. A plurality of wires 879 couple configuration elements in 876*a,b* to switches 873*a,c* & 874*a,c*. Dynamic router 870 in FIG. 8C shows a dynamically reconfigurable router (router=interconnect structure) within an integrated circuit comprising: a receiver input 875*a*; and a plurality of driver outputs 872*a*-872*c* capable of configurably coupling to the receiver input 875*a*; programmable means including coupling any one of said driver outputs to said receiver input, and preventing two or more of said driver outputs coupling to the same receiver input during dynamic reconfiguration. The dynamic router 870 including a plurality of configuration elements (inside 876*a* & 876*b*) that are configured by two or more control signals 877. The dynamic router 870, wherein the control signals 877 is generated by a control unit coupled to an instruction processing unit. The dynamic router 870 further comprising a plurality of configuration bits that comprises a tri-state during which all of the plurality of output drivers are decoupled from a receiver input. The interconnect structure 870 wherein the plurality of driver outputs coupling to a receiver input is dynamically reconfigured in one clock cycle. The dynamic router 870 wherein the plurality of drivers coupling to a receiver input is dynamically reconfigured in a plurality of clock cycles. The dynamic router 870 comprising a programmable means that comprises dynamically programming a plurality of configuration elements in a manner to not have two output drivers coupled to one input receiver at any instance of time.

870 in FIG. 8C shows a dynamically reconfigurable interconnect structure within an integrated circuit comprising: a plurality of configuration elements that can configurably couple one of the plurality of drivers 871 to a receiver input 875, the programmable means comprising the capability to set all of the plurality of configuration elements to a tri-state mode that decouples all the drivers 871 from the input 875. The interconnect structure 850, wherein the tri-state mode is achieved in one clock cycle. The interconnect structure 850, wherein a dynamic reconfigurability is achieved by first tri-stating all the drivers, and then programming the required driver to couple to the input. A dynamic router 870 having a configurably coupled wire segment 878 to couple a plurality of output nodes to an input node, the programmable means ensuring no two output nodes couple to the wire segment during dynamic reconfiguration.

Figure 8D:
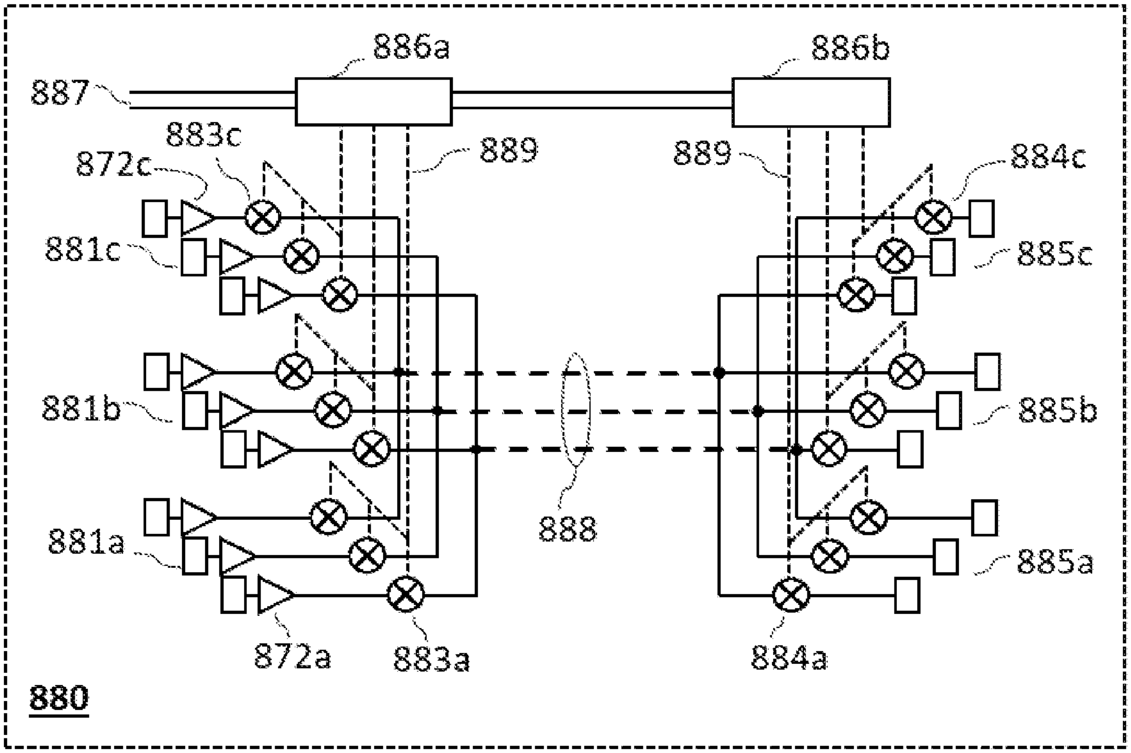
FIG. 8D shows a dynamically reconfigurable bus router in a macroprocessor.

A wire couples two nodes. A bus couples a first set of nodes to a second identical number set of nodes. A bus forms a set of parallel wires between the two sets of nodes. A dynamic bus router 890 according to the descriptions provided in 800 & 850 is shown in FIG. 8D. A plurality of output nodes 881*a* coupled to output drivers 872 forms one output bus. Likewise, a plurality of input nodes 875*a* forms one input bus. A plurality of output buses 881 can be configurably coupled to a plurality of input buses 875 via a switch matrix 883 & 884, and by one or more configuration circuits 886. A single output of configuration circuit 886 can select all output drivers in one output bus 881 to couple to its destination. A single output of configuration circuit 876*b* can select all inputs in one bus 885 to couple to its origin.

880 in FIG. 8D shows a dynamically reconfigurable bus router within an integrated circuit comprising: a receiver bus 885 having a set of nodes; and a plurality of driver buses 881 capable of configurably coupling to the receiver bus 885, each driver bus comprising a matching set of nodes with the receiver bus; programmable means including coupling any one of said driver buses 881 to said receiver bus 885, and preventing two or more of said driver buses 881 coupling to the receiver bus 885 during dynamic reconfiguration. The dynamic bus router 800 wherein the plurality of driver buses 881 coupling to a receiver bus 885 is dynamically reconfigured in one of: a single clock cycle, and a plurality of clock cycles. In FIG. 8D, 881*a,b,c* & 885*a,b,c* are nodes; 883*a,c* & 884*a,c* are switches; 886*a,b* are configurable decoders; 887 & 889 are identical to 877 & 879 respectively in FIG. 8C.

880 in FIG. 8D shows a dynamically reconfigurable interconnect bus structure comprising: a plurality of output buses, one of said output buses comprised of a plurality of driver outputs; and a plurality of input buses, one of said input buses comprised of a plurality of receiver inputs; and a plurality of configuration elements that can configurably couple an output bus to an input bus; programable means having the capability to prevent two driver outputs to couple to a single receiver input during a dynamic reconfiguration. The interconnect structure 880 comprising a bus-structure and bus-connectivity between a set of driver output nodes and a set of receiver input nodes. A configurable processor comprising a user configurable interconnect structure comprised of: a user configurable logic element (813*a* in FIG. 8A); and a bit-level user configurable wire (878 in FIG. 8B); and a byte-level user configurable bus (888 in FIG. 8D) comprising a plurality of wires.

Figure 9:
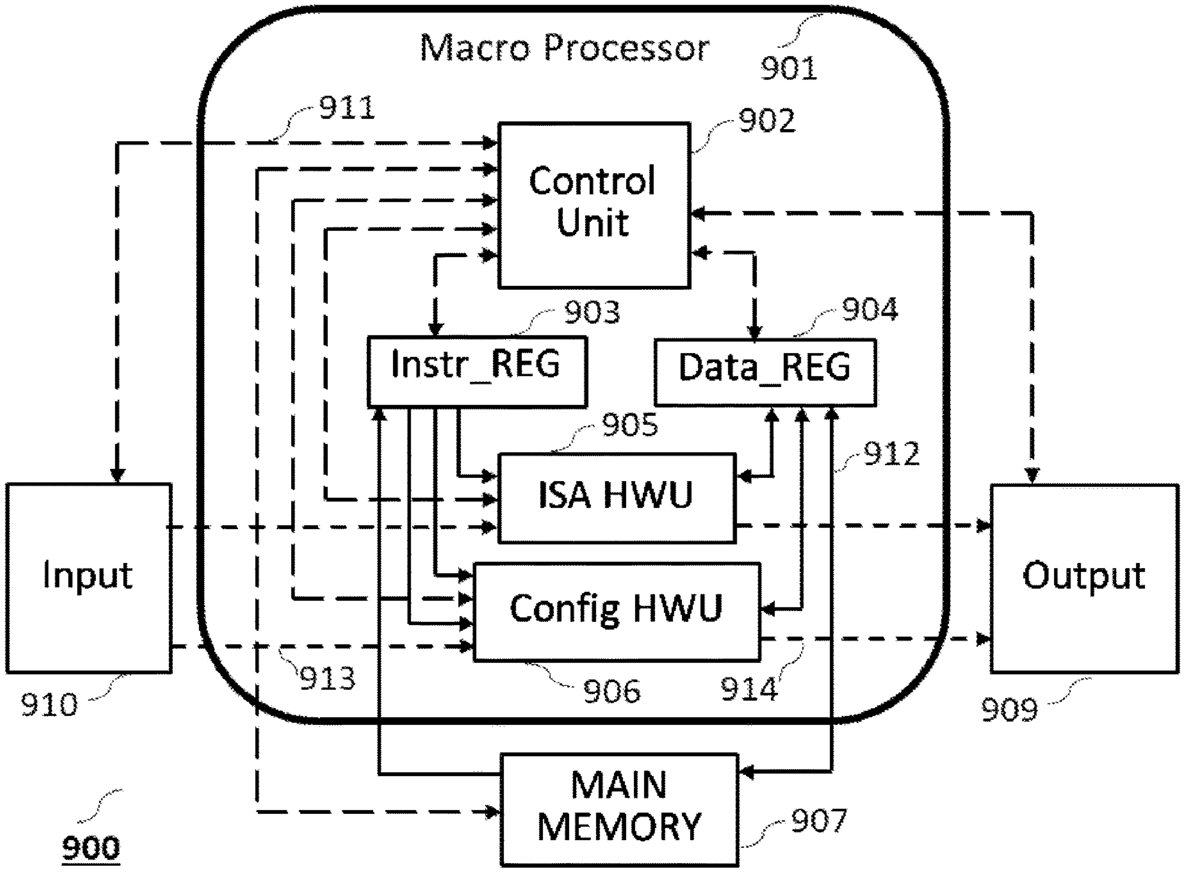
FIG. 9 shows an embodiment of a macroprocessor structure.

In summary, a macroprocessor 900 in FIG. 9 is disclosed. 901 is a smaller portion of the macroprocessor. Macroprocessor 900 comprises: a control unit 902; and an instruction register 903; and a data register 904; and an instruction set architecture defined hardware unit (ISA HWU) 905; and a user programmable configurable hardware unit (Config HWU) 906. Control unit 902 uses a plurality of control signals such as 911 to communicate with other circuit blocks. The macroprocessor 900 further coupled to input 910 and output 909 devices. The macroprocessor 900, wherein the control unit 902 is coupled to the instruction register 903, and data register 904, and ISA HWU 905, and Config HWU 906, and input device 910, and output device 909. Input 910 has direct access 913 to the Config HWU 905. Data register 904 uses a plurality of data signals such as 912 to exchange data. The macroprocessor 900, wherein a first instruction in Instruction Register 903 is executed in the ISA HWU 905, and a second instruction in Instruction Register 903 is executed in Config HWU 906. The macroprocessor 900, wherein a first and a second instruction in Instruction Register 903 is executed concurrently in the ISA HWU 905 and Config HWU 106. The macroprocessor 900 providing a back-and-forth computation between the ISA HWU 905 and the Config HWU 906. The macroprocessor 900 providing a content computation in the Config HWU 906. The macroprocessor 900, wherein the Config HWU 906 is dynamically reconfigurable. The macroprocessor 900 coupled to a cache coherent memory unit 907 to retrieve instruction and compute data. Macroprocessor 900 departing from von-Neuman and Harvard single-instruction processing computer architectures by having Config HWU 906 function compute capability in addition to ISA HWU 905 single instruction execution.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as described in this disclosure document.

What is claimed is:

1. A configurable data router in an interconnect structure, comprising:
- an output port comprising a wire to transmit data; and
- a plurality of input ports, each of the input ports comprising a wire to receive data; and
- a configurable means of coupling the output port to the plurality of input ports comprising:
  - a plurality of configurable switches to couple the output port to the plurality of said input ports respectively, and
  - a configurable signal generation unit to configure the plurality of switches; and
  - a programmable method to program the signal generation unit to configure an input port coupling to the output port comprising a sequence for decoupling the plurality of input ports from the output port prior to coupling one of the plurality of input ports to the output port.

2. The structure of claim 1, wherein the programmable method further comprising the signal generation unit to:
- receive a bit-code; and
- decode the bit-code and generate a plurality of switch-control signals to facilitate one of coupling the output port to one of said plurality of input ports and decoupling the output port from the plurality of input ports as specified in the bit-code.

3. The structure of claim 2, wherein the bit-code is generated by one of: a control unit of a microprocessor, and a programmable logic unit.

4. The structure of claim 2, wherein a first value of the bit-code generates the plurality of switch-control signals to decouple the output from all of the inputs.

5. The structure of claim 1, wherein the configurable signal generation unit further comprises a plurality of configurable memory elements, each memory element comprising at least two memory states to activate or deactivate a switch in the plurality of configurable switches.

6. The structure of claim 5, wherein the programmable method further comprising the signal generation unit to:
- receive a bit-code; and
- decode the bit-code, and program the plurality of configurable memory elements in the signal generation unit as specified in the bit-code; and
- generate a plurality of switch-control signals to facilitate one of coupling the output port to one of said plurality of input ports, and decoupling the output port from the plurality of input ports.

7. The structure of claim 6, wherein the programmable method further comprising the signal generation unit to:
- receive a first bit-code to decouple the output port from all the input ports; and
- receive a second bit-code to couple the output port to one of the input ports.

8. The structure of claim 7, wherein the first bit-code is received in a first portion of a clock-cycle, and the second bit-code is received in a second portion of the clock-cycle.

9. A configurable interconnect structure to provide a plurality of inputs to a configurable logic tile, comprising:
- a first plurality of configurable byte-level input buses, each byte-level input bus comprising an identical number of bit-level input bus wires; and
- a first plurality of configurable bit-level input wires; and
- a first input port of a configurable logic tile, the first input port comprising said identical number of bit-level input bus wires; and
- a second input port of the configurable logic tile comprising one or more configurable bit-level input wires, whereby a logic operation is performed in the configurable logic tile using any one or more bit-level inputs from the two input ports; and
- a configurable means of coupling-a one of said plurality of first byte-level input bus wires to the first input port, and coupling at least one of the first plurality of bit-level wires to the second input port, the configurable means further comprising a configurable signal generation unit; and
- a programmable means to couple and decouple a one of the first plurality of byte-level input buses to the first input port, and to couple and decouple at least one of the second plurality of bit-level input wires to the second input port of the configurable logic tile.

10. The structure of claim 9, wherein the configurable interconnect structure further comprising:
- a second plurality of bit-level wires, and a second plurality of byte-level wire buses, each of the second plurality of byte-level wire buses comprising an identical number of wires as the first plurality of configurable byte-level input bus wires; and a plurality of byte configurable switches, at least one of said byte configurable switches comprising a configurable memory element to couple one of the first plurality of byte-level input bus to one of the second plurality of byte-level bus wires respectively; and a bit configurable switch comprising a configurable memory element to couple one of said first plurality bit-level input wires to one of said second plurality of bit-level wires.

11. The structure of claim 9, wherein the programmable method further comprising the signal generation unit to:

receive a first configuration data set to decouple the first plurality of byte-level input buses from the first input port; and receive a second configuration data set to couple one of the first plurality of byte-level input buses to the first input port.

12. The structure of claim 11, wherein the first configuration data set further decouples the first plurality of input wires from the second input port, and the second configuration data set couples at least one of the said first plurality of input wires to the second input port.

13. The structure of claim 9, wherein:

the configurable logic tile further comprising:

first and second configurable tile buses, each of said first and second tile buses comprising an identical number of tile bus wires; and first and second register banks, each register of the first and second register banks comprising an output wire, each of said register banks comprising a plurality of register output wires equaling the number of tile bus wires; and the configurable means further comprising:

a plurality of byte configurable switches, a byte configurable switch capable of coupling two equal pluralities of wires respectively; and the programmable method further comprising:

defining a configuration memory element state assigned to configure a byte configurable switch to couple two sets of wires respectively, or decouple two sets of wires.

14. The structure of claim 10, wherein the configurable means comprises a configuration circuit comprised of:

a memory write circuitry to receive a bit-stream of memory data and configure a portion of configuration memory elements as specified by a bit-pattern; and a control unit to receive a bit-code and generate control signals that configure a second portion of configuration memory elements as specified by the bit-code.

15. The structure of claim 14, wherein the bit-code controls a plurality of byte configurable switches to dynamically route bus signals into a group of buses controlled by the bit-code generated control signals.

16. The structure of claim 14, wherein the bit-code is generated by one of: a control unit of a microprocessor, and a programmable logic unit.

17. A configurable interconnect structure, comprised of:

a plurality of buses, each bus comprising a first plurality of identical number of wires; and a second plurality of wires; and a plurality of byte configurable switches to couple the buses, at least one of said byte configurable switches coupling a first plurality of wires of a first bus respectively to a first plurality of wires of a second bus; and a plurality of bit configurable switches to couple the second plurality of wires, at least one of said bit configurable switches coupling a first wire to a second wire; and a configuration circuit to configure the pluralities of bit and byte configurable switches; and a programmable method to program the plurality of bit and byte configurable switches to configure the interconnect structure.

18. The structure of claim 17, further comprising:

a configurable memory element in each of said byte configurable switches, the memory element enabling coupling or decoupling of two buses; and a configurable memory element in each of said bit configurable switches, the memory element enabling coupling or decoupling of two wires;

wherein, the configuration circuit is coupled to all bit and byte configurable memory elements to program the interconnect structure.

19. The structure of claim 18, wherein the programmable method further comprised of:

using a pre-determined bit-stream of configuration memory data for the configuration circuit to program the plurality of bit configurable memory elements and a portion of the byte configurable memory elements; and receiving a run-time determined bit-code in a decoder circuit in the configuration circuit to dynamically program a second portion of byte configurable memory elements.

20. The structure of claim 19, wherein the bit-code is generated by one of: a control unit in a computer processor unit, and a programmable logic unit.

* * * * *